United States Patent
Dudda et al.

(10) Patent No.: US 11,902,988 B2
(45) Date of Patent: Feb. 13, 2024

(54) HANDLING MISALIGNMENT BETWEEN ARRIVAL OF CRITICAL DATA FOR TRANSMISSION AND TRANSMISSION OCCASIONS OF A CONFIGURED GRANT

(71) Applicant: Telefonaktiebolaget LM Ericsson (publ), Stockholm (SE)

(72) Inventors: Torsten Dudda, Wassenberg (DE); Zhenhua Zou, Solna (SE); Abdulrahman Alabbasi, Kista (SE); Henrik Enbuske, Stockholm (SE); Kittipong Kittichokechai, Järfälla (SE); Alexey Shapin, Luleå (SE); Jonas Fröberg Olsson, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 431 days.

(21) Appl. No.: 17/309,165

(22) PCT Filed: Oct. 3, 2019

(86) PCT No.: PCT/SE2019/050959
§ 371 (c)(1),
(2) Date: May 1, 2021

(87) PCT Pub. No.: WO2020/091642
PCT Pub. Date: May 7, 2020

(65) Prior Publication Data
US 2022/0022245 A1   Jan. 20, 2022

Related U.S. Application Data

(60) Provisional application No. 62/754,305, filed on Nov. 1, 2018.

(51) Int. Cl.
*H04W 72/23* (2023.01)
*H04L 5/00* (2006.01)

(52) U.S. Cl.
CPC ........... *H04W 72/23* (2023.01); *H04L 5/0007* (2013.01)

(58) Field of Classification Search
CPC ............... H04W 72/23; H04W 72/569; H04W 72/1268; H04L 5/0007; H04L 5/0064; H04L 5/0094
See application file for complete search history.

(56) References Cited

U.S. PATENT DOCUMENTS 10,448,421 B2 * 10/2019 Bhattad ............. H04W 72/0446
2009/0041246 A1 * 2/2009 Kitazoe ............... H04W 12/037
370/329

(Continued)

FOREIGN PATENT DOCUMENTS

WO   2016060895 A2   4/2016
WO   2018129325 A1   7/2018

OTHER PUBLICATIONS

Mogensen, Rasmus S., et al. "Selective redundant MP-QUIC for 5G mission critical wireless applications." 2019 IEEE 89th Vehicular Technology Conference (VTC2019—Spring). IEEE, 2019. (Year: 2019).*

(Continued)

*Primary Examiner* — Sharad Rampuria
(74) *Attorney, Agent, or Firm* — Withrow & Terranova, PLLC

(57) ABSTRACT

Systems and methods are disclosed herein for transmitting a mixture of critical and non-critical data in a wireless network. In some embodiments, a method performed by a wireless device comprises receiving a configured uplink grant that allocates uplink resources in a plurality of transmission time intervals and determining, at a time $t_{arrival}$, that critical data is to be transmitted using the configured uplink grant, where a time $t_{arrival}+PT$ occurs after a start of a particular transmission time interval and where PT is a (Continued)

Example of misaligned critical data with non-critical data in the beginning and in the end with 8 possible transmission sub-occasions per configure grant preparation time needed to prepare an uplink transmission on the configured uplink grant. The method further comprises transmitting an uplink transmission comprising the critical data using allocated uplink resources in the particular transmission time interval starting at a time that is at or after the time $t_{arrival}$+PT. Corresponding embodiments of a wireless device are also disclosed.

21 Claims, 16 Drawing Sheets

(56) References Cited

U.S. PATENT DOCUMENTS

| | | | |
|---|---|---|---|
| 2017/0257876 A1* | 9/2017 | Loehr | H04W 72/56 |
| 2018/0199359 A1 | 7/2018 | Cao et al. | |
| 2018/0376497 A1* | 12/2018 | You | H04L 5/0055 |

OTHER PUBLICATIONS

Author Unknown, "Technical Specification Group Radio Access Network; NR; Physical layer procedures for data (Release 15)," Technical Specification 38.214, Version 15.3.0, Sep. 2018, 3GPP Organizational Partners, 96 pages.

Author Unknown, "Technical Specification Group Radio Access Network; NR; NR and NG-RAN Overall Description; Stage 2 (Release 15)," Technical Specification 38.300, Version 15.2.0, Jun. 2018, 3GPP Organizational Partners, 87 pages.

Author Unknown, "Technical Specification Group Radio Access Network; NR; Medium Access Control (MAC) protocol specification," Technical Specification 38.321, Version 15.3.0, Sep. 2018, 3GPP Organizational Partners, 76 pages.

Author Unknown, "Technical Specification Group Radio Access Network; NR; Radio Resource Control (RRC) protocol specification (Release 15)," Technical Specification 38.331, Version 15.3.0, Sep. 2018, 3GPP Organizational Partners, 445 pages.

Ericsson, "R1-1810174: Enhancement to Uplink and Downlink Physical Channels for NR URLLC," 3GPP TSG-RAN WG1 Meeting #94bis, Oct. 8-12, 2018, Chengdu, China, 12 pages.

Nokia, et al., "R1-1804618: On UL multiplexing between eMBB and URLLC," 3GPP TSG-RAN WG1 Meeting #92bis, Apr. 16-20, 2018, Sanya, China, 6 pages.

Nokia, et al., "RP-182090: Revised SID: Study on NR Industrial Internet of Things (IoT)," 3GPP TSG RAN meeting #81, Sep. 10-13, 2018, Gold Coast, Australia, 5 pages.

Sequans, "R1-1805158: Considerations for UL multiplexing with different reliability requirements," 3GPP TSG RAN WG1 Meeting #92bis, Apr. 16-20, 2018, Sanya, China, 5 pages.

International Search Report and Written Opinion for International Patent Application No. PCT/SE2019/050959, dated Jan. 22, 2020, 12 pages.

Catt, "R1-1803768: Multiplexing of UL transmissions of different reliability requirements," 3GPP TSG RAN WG1 Meeting #92bis, Apr. 16-20, 2018, Sanya, China, 7 pages.

Huawei, et al., "R1-1810159: Enhanced UL configured grant transmissions," 3GPP TSG RAN WG1 Meeting #94bis, Oct. 8-12, 2018, Chengdu, China, 9 pages.

Mediatek Inc, et al., "R2-1711423: LCP for grant-free transmissions," 3GPP TSG-RAN WG2 #99bis, Oct. 9-13, 2017, Prague, Czech Republic, 5 pages.

Extended European Search Report for European Patent Application No. 19880701.8, dated Jun. 14, 2022, 9 pages.

Examination Report for Indian Patent Application No. 202147023561, dated Feb. 22, 2022, 5 pages.

* cited by examiner

*Quantized transmission sub-occasions within a grant, that gNB has to check*

Example of misaligned critical data with non-critical data in the beginning and in the end with 8 possible transmission sub-occasions per configure grant

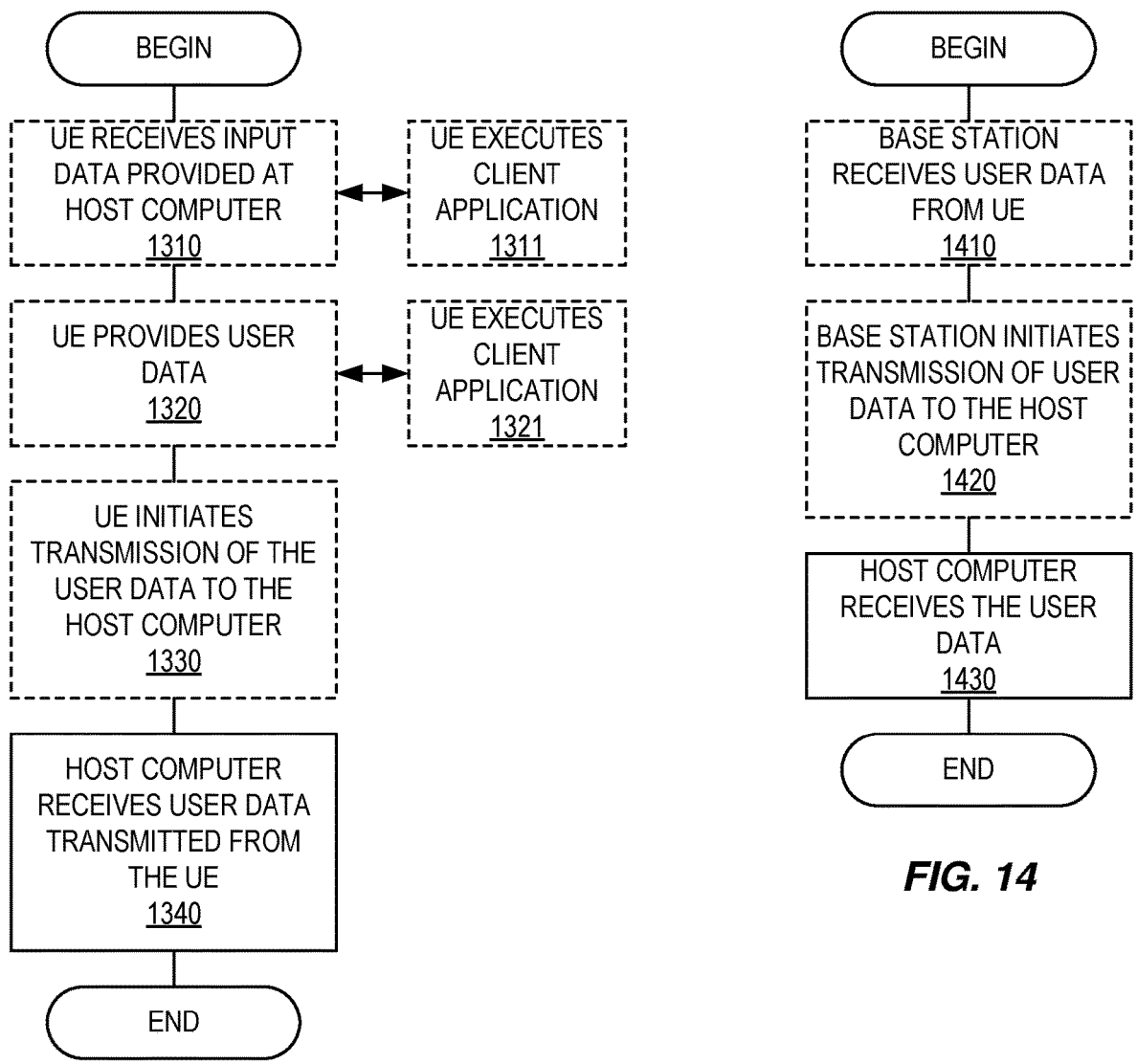

HANDLING MISALIGNMENT BETWEEN ARRIVAL OF CRITICAL DATA FOR TRANSMISSION AND TRANSMISSION OCCASIONS OF A CONFIGURED GRANT

RELATED APPLICATIONS

This application is a 35 U.S.C. § 371 national phase filing of International Application No. PCT/SE2019/050959, filed Oct. 3, 2019, which claims the benefit of provisional patent application Ser. No. 62/754,305, filed Nov. 1, 2018, the disclosures of which are hereby incorporated herein by reference in their entireties.

TECHNICAL FIELD

The present disclosure relates to a wireless network and, in particular, to transmission of a mixture of critical and non-critical data in a wireless network.

BACKGROUND

In a newly defined Third Generation Partnership Project (3GPP) study item (Nokia et al., "RP-182090: Revised SID: Study on NR Industrial Internet of Things (IoT)," 3GPP TSG RAN meeting #81, Sep. 10-13, 2018), New Radio (NR) technology enhancements are studied with the target of providing more deterministic low-latency delivery of data. This traffic is also referred to as Time Sensitive Networking (TSN) traffic with typically periodic packet occurrences per cycle time.

Uplink traffic can be scheduled with dynamic uplink grants or configured uplink grants. In case of dynamic grants, the NR Node B (gNB) provides an uplink grant to the User Equipment (UE) for each uplink transmission. Configured grants are pre-allocated, i.e. provided once to the UE; thereafter, the configured uplink grant is valid for usage for uplink transmissions according to a configured periodicity. The UE does not need to transmit padding on those uplink resources if no uplink data is available for transmission, i.e. may skip an uplink transmission on such grants.

A typical NR Internet of Things (IoT) device would handle communication for multiple service types, e.g. periodic Ultra-Reliable and Low Latency Communication (URLLC) type robot control messages (also referred to as TSN-like traffic), URLLC type of occasional alarm signals (for which periodic resources would need to be configured), occasional sensor data transmissions, and other enhanced Mobile Broadband (eMBB)/Mobile Broadband (MBB) best-effort type traffic such as occasional video transmissions or software updates. It would lead to a traffic mix to be multiplexed by the UE for uplink transmissions, i.e. Medium Access Control (MAC) multiple logical channels with different priorities would need to be configured.

The UE needs time to prepare a Physical Uplink Shared Channel (PUSCH) transmission on an uplink grant. If the Logical Channel's (LCH's) data arrives too late, it cannot be included in the current constructed PUSCH data transmission and it has to wait for the next grant. For dynamic grant, the time to prepare PUSCH transmission has been specified in 3GPP TS 38.214 V15.3.0—Table 6.4-2 and Table 6.4-1, called N2, as described in Table 1 and Table 2 for different UE capabilities.

TABLE 1

PUSCH preparation time for PUSCH timing capability 1.

| μ | PUSCH preparation time N2 [symbols] |
|---|---|
| 0 | 10 |
| 1 | 12 |
| 2 | 23 |
| 3 | 36 |

TABLE 2

PUSCH preparation time for PUSCH timing capability 2.

| μ | PUSCH preparation time N2 [symbols] |
|---|---|
| 0 | 5 |
| 1 | 5.5 |
| 2 | 11 for frequency range 1 |

For configured grant, although the UE does not need to decode Physical Downlink Control Channel (PDCCH) per grant, a corresponding PUSCH preparation time to build the MAC Protocol Data Unit (PDU) is also expected at the UE side. In what follows, the phrase "PUSCH processing time" is used to denote the needed time to prepare PUSCH transmission in either configured grant or dynamic grant.

FIG. 1 illustrates the concept of PUSCH processing time, where in the second occasion it can be seen that TSN traffic is not fitted in the PUSCH because it arrived too late according to what the Preparation Time (PT) allows. However, eMBB data fills the PUSCH since it arrives within the processing time.

In addition, 3GPP Technical Specification (TS) 38.321 has Logical Channel Prioritization (LCP) restriction related with configured grants (Type 1 but not Type 2) for non-critical LCHs. This restriction can be Radio Resource Control (RRC) configured by the gNB (see, e.g., 3GPP TS 38.331) through the following "LogicalChannelConfig information element":

configuredGrantType1Allowed ENUMERATED {true} OPTIONAL, -- Need R

Also, it is captured in 3GPP TS 38.321 by the following restriction:

RRC additionally controls the LCP procedure by configuring mapping restrictions for each logical channel:

allowedSCS-List which sets the allowed Subcarrier Spacing(s) for transmission;

maxPUSCH-Duration which sets the maximum PUSCH duration allowed for transmission;

configuredGrantType1Allowed which sets whether a configured grant Type 1 can be used for transmission;

Although it is not agreed yet in the specification, in what follows, it is assumed that the similar restriction for configured grant Type 2 exists. This has been proposed for 3GPP; and, if it is not agreed, then what follows applies only for configured grant Type 1.

As shown in FIG. 2, the restriction prevents non-critical traffic from transmitting on configured grant if it was intended for critical traffic. This mechanism does not solve the problem of late arrival of TSN traffic, since the URLLC data can only be sent in the next opportunity, given that extra resources are available. On the other hand, this mechanism empties the transmission opportunity (second transmission occasion in FIG. 2), which might be intentionally set by the gNB scheduler to reduce interference to other UEs' uplink traffic.

SUMMARY

Systems and methods are disclosed herein for transmitting a mixture of critical and non-critical data in a wireless network. Embodiments of a method performed by a wireless device and corresponding embodiments of a wireless device are disclosed. In some embodiments, a method performed by a wireless device for transmitting a mixture of critical and non-critical data comprises receiving a configured uplink grant that allocates uplink resources in a plurality of transmission time intervals and determining, at a time $t_{arrival}$, that critical data is to be transmitted using the configured uplink grant, where a time $t_{arrival}$+Preparation Time (PT) occurs after a start of a particular transmission time interval from among the plurality of transmission time intervals and where PT is a preparation time needed to prepare an uplink transmission on the configured uplink grant. The method further comprises transmitting an uplink transmission comprising the critical data using allocated uplink resources in the particular transmission time interval starting at a time that is at or after the time $t_{arrival}$+PT. In this manner, latency of such critical data transmissions can be improved.

In some embodiments, transmitting the uplink transmission comprises, after the critical data has arrived at the wireless device for transmission at the time $t_{arrival}$, preparing the uplink transmission comprising the critical data. Preparing the uplink transmission comprising the critical data comprises processing the critical data to create a Medium Access Control (MAC) Protocol Data Unit (PDU) and providing the MAC PDU to a Physical (PHY) layer of the wireless device for transmission.

In some embodiments, two or more discrete points in time at which uplink transmission can begin are defined within the particular transmission time interval. Further, the time at which the uplink transmission comprising the critical data starts is a time that corresponds to one of the two or more discrete points that occurs at or after $t_{arrival}$+PT.

In some embodiments, the method further comprises receiving a configuration of a duration, $T_D$, of transmission for expected critical data.

In some embodiments, there is a restriction on transmission of non-critical data for the configured uplink grant, and the method further comprises determining that the restriction on transmission of non-critical data is removed for the particular transmission time interval after an amount of time $T_D$ has expired since the start of the uplink transmission comprising the critical data. In some embodiments, the method further comprises transmitting an uplink transmission comprising non-critical data using allocated uplink resources in the particular transmission time interval after the amount of time $T_D$ has expired since the start of the uplink transmission comprising the critical data.

In some embodiments, the method further comprises transmitting an uplink transmission comprising non-critical data using allocated uplink resources in the particular transmission time interval after the uplink transmission comprising the critical data is complete. In some embodiments, the method further comprises transmitting an uplink transmission comprising non-critical data using allocated uplink resources in the particular transmission time interval before the start of the uplink transmission comprising the critical data.

In some embodiments, the method further comprises, for a later transmission time interval from among that plurality of transmission time intervals that occurs after the particular transmission time interval in which the critical data was transmitted, determining, at a time t+Δ, that there is no critical data to be transmitted during the later transmission time interval of the configured uplink grant, where t is a start time of the later transmission time interval and Δ is a predefined or configured amount of time. The method further comprises, upon determining, at the time t+Δ, that there is no critical data to be transmitted during the later transmission time interval of the configured uplink grant, transmitting an uplink transmission comprising non-critical data using allocated uplink resources in the later transmission time interval starting at a time at or after t+Δ. In some embodiments, the method further comprises receiving a configuration of Δ associated with the configured uplink grant. In some embodiments, Δ is at least K*L Orthogonal Frequency Division Multiplexing (OFDM) symbols where K is a number of configured repetitions for critical data transmission and L is a duration of each repetition of critical data transmission. In some other embodiments, Δ is at least K*14 OFDM symbols where K is a number of configured repetitions for critical data transmission.

In some embodiments, a wireless device for transmitting a mixture of critical and non-critical data comprises radio front end circuitry and processing circuitry associated with the radio front end circuitry. The processing circuitry is configured to cause the wireless device to receive a configured uplink grant that allocates uplink resources in a plurality of transmission time intervals and determine, at a time $t_{arrival}$, that critical data is to be transmitted using the configured uplink grant, where a time $t_{arrival}$+PT occurs after a start of a particular transmission time interval from among the plurality of transmission time intervals and where PT is a preparation time needed to prepare an uplink transmission on the configured uplink grant. The processing circuitry is further configured to cause the wireless device to transmit an uplink transmission comprising the critical data using allocated uplink resources in the particular transmission time interval starting at a time that is at or after the time $t_{arrival}$+PT.

Embodiments of a method performed by a base station and corresponding embodiments of a base station are also disclosed. In some embodiments, a method performed by a base station comprises transmitting a configured uplink grant to a wireless device. The configured uplink grant allocates uplink resources for uplink transmission from the wireless device in a plurality of transmission time intervals. The method further comprises monitoring a transmission time interval from among the plurality of transmission time intervals of the configured uplink grant for an uplink transmission from the wireless device, wherein the uplink transmission can start sometime after a start of the transmission time interval.

In some embodiments, the uplink transmission can start at any OFDM symbol within the transmission time interval. In some other embodiments, the uplink transmission can start at any one of two or more discrete points within the transmission time interval.

In some embodiments, the method further comprises configuring, for the wireless device, a duration time expected for uplink transmissions of critical data in relation to the configured uplink grant.

In some embodiments, there is a restriction on transmission of non-critical data for the configured uplink grant, and the method further comprises configuring, for the wireless device, a delta value that defines an amount of time after the start of the transmission time interval after which a restriction on transmission of non-critical data is removed if there is no critical data to be transmitted by the wireless device on the configured uplink grant. Further, in some embodiments, the delta value is at least K*L OFDM symbols where K is a number of configured repetitions for critical data transmission and L is a duration of each repetition of critical data transmission. In some other embodiments, the delta value is at least K*14 OFDM symbols where K is a number of configured repetitions for critical data transmission.

In some embodiments, a base station comprises processing circuitry configured to cause the base station to transmit a configured uplink grant to a wireless device, where the configured uplink grant allocates uplink resources for uplink transmission from the wireless device in a plurality of transmission time intervals. The processing circuitry is further configured to cause the base station to monitor a transmission time interval from among the plurality of transmission time intervals of the configured uplink grant for an uplink transmission from the wireless device, wherein the uplink transmission can start sometime after a start of the transmission time interval.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 13 and 14 are flowcharts illustrating methods implemented in a communication system in accordance with some embodiments of the present disclosure;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Embodiments of the present disclosure are described herein within the context of Third Generation Partnership Project (3GPP) New Radio (NR) radio technology (3GPP Technical Specification (TS) 38.300 V15.2.0). It is understood that the problems and solutions described herein are equally applicable to wireless access networks and User Equipment devices (UEs) implementing other access technologies and standards. NR is used as an example technology where embodiments of the present disclosure are suitable, and using NR in the description therefore is particularly useful for understanding the problem and solutions solving the problem. In particular, embodiments of the present disclosure are also applicable to 3GPP Long Term Evolution (LTE), or 3GPP LTE and NR integration, also denoted as non-standalone NR.

Figure 1:
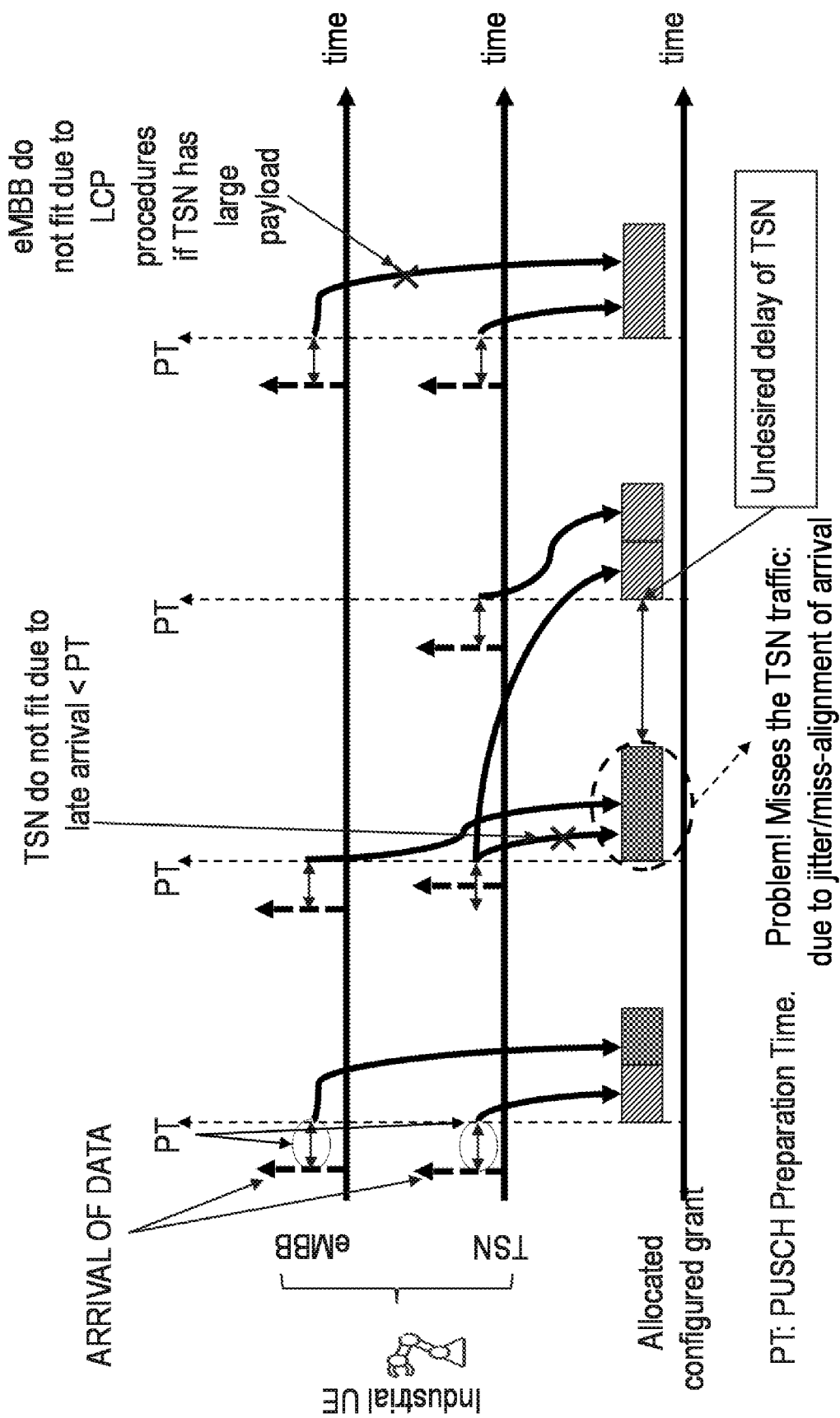
FIG. 1 illustrates the concept of Physical Uplink Shared Channel (PUSCH) processing time.

There currently exist certain challenge(s). In a mixed services environment, multiple traffic types, e.g., Ultra-Reliable and Low Latency Communication (URLLC)/Time Sensitive Networking (TSN) traffic and enhanced Mobile Broadband (eMBB) traffic, might be generated from a single UE. Implementing the current state of the art solutions for a configured grant might result in several problems. One issue appears if the TSN deterministic traffic data has arrival misalignment. This arrival misalignment is a misalignment between the arrival of the TSN deterministic traffic data for transmission and the transmission opportunities of the configured grant such that the amount of time between the arrival of the TSN deterministic data for transmission and the start of the upcoming transmission opportunity for the configured grant is less than the Physical Uplink Shared Channel (PUSCH) processing time. If such arrival misalignment is less than the preparation time of PUSCH (see, e.g., 3GPP TS 28.214—Table 6.4-2 and Table 6.4-1), i.e., TSN arrival is <N2 in Table 1 and Table 2, the Medium Access Control (MAC) layer and the Physical (PHY) layer do not have sufficient time to prepare the PUSCH; hence, another Logical Channel's (LCH's) data (which arrived before such time) will be transmitted, not the TSN data. Therefore, the transmission of the TSN LCH data will be delayed until the next available configured grant opportunity, which means that the latency of TSN streams will not be met. FIG. 1 illustrates this problem with the existing specification when handling intra-UE mixed services. It is clear that, in the second opportunity of the configured grant, the TSN data arrived too late; hence, the TSN data is transmitted on the third opportunity of the configured grant.

Figure 2:
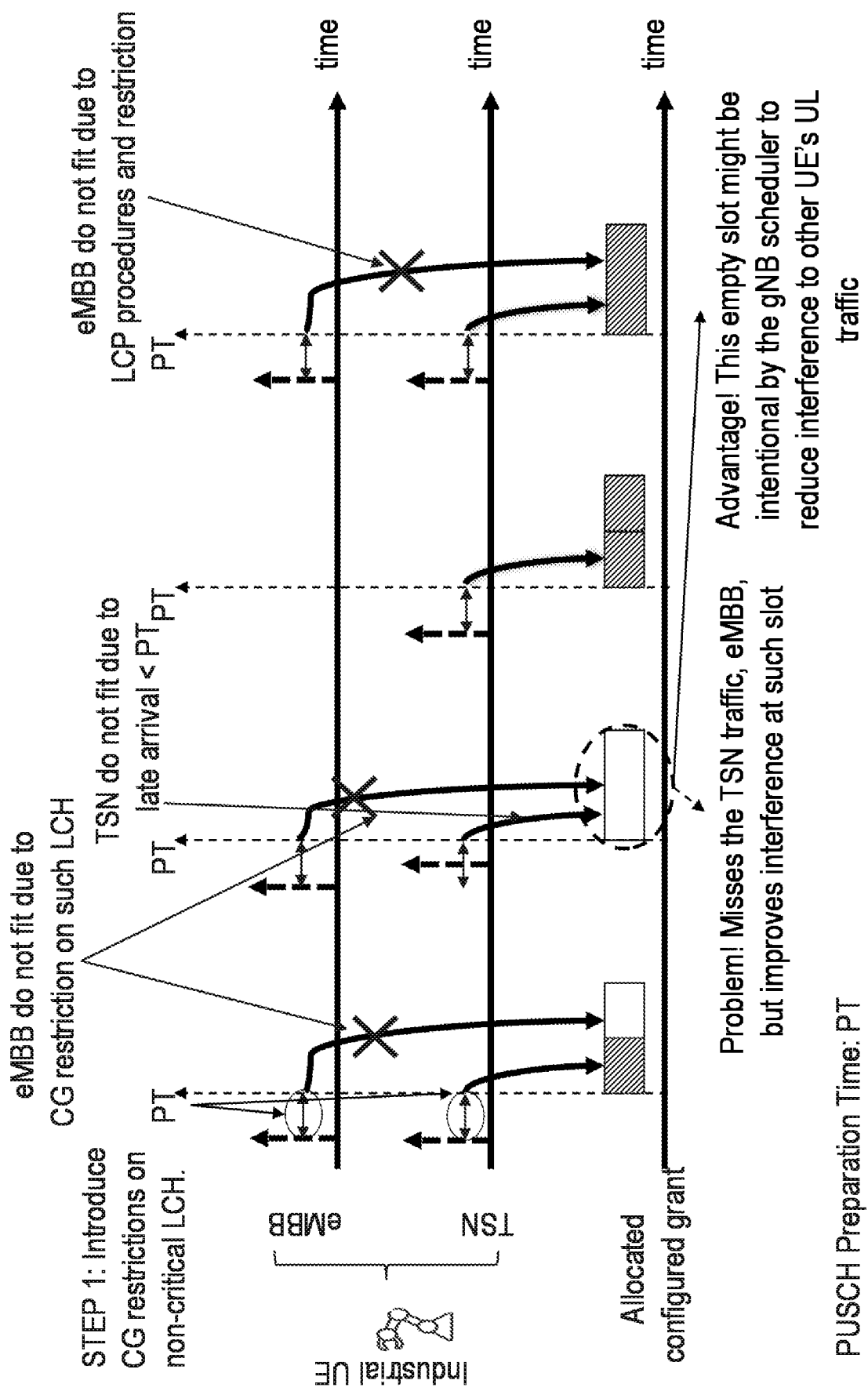
FIG. 2 illustrates a problem of misalignment between arrival of Time Sensitive Networking (TSN) data for transmission at a User Equipment (UE) and a start of a next transmission opportunity of a configured grant for transmitting TSN data.

In an alternative scenario that has been discussed and is partly mentioned in TS 38.321, configured grant Type 1 or 2 restriction is flagged on the eMBB LCH. Again, note that Type 2 restriction is not yet in the specification, but it is assumed that this has been discussed already during the process of proposing restriction for configured grant Type 1. FIG. 2 illustrates the problem caused by only introducing a configured grant restriction on non-critical LCHs and, in particular, illustrates such a case in the second transmission occasion of the configured grant. In such a transmission occasion, neither TSN LCH data nor eMBB LCH data are transmitted in the PUSCH on that transmission occasion. Hence, this rule introduces some spectral inefficiency.

Figure 3:
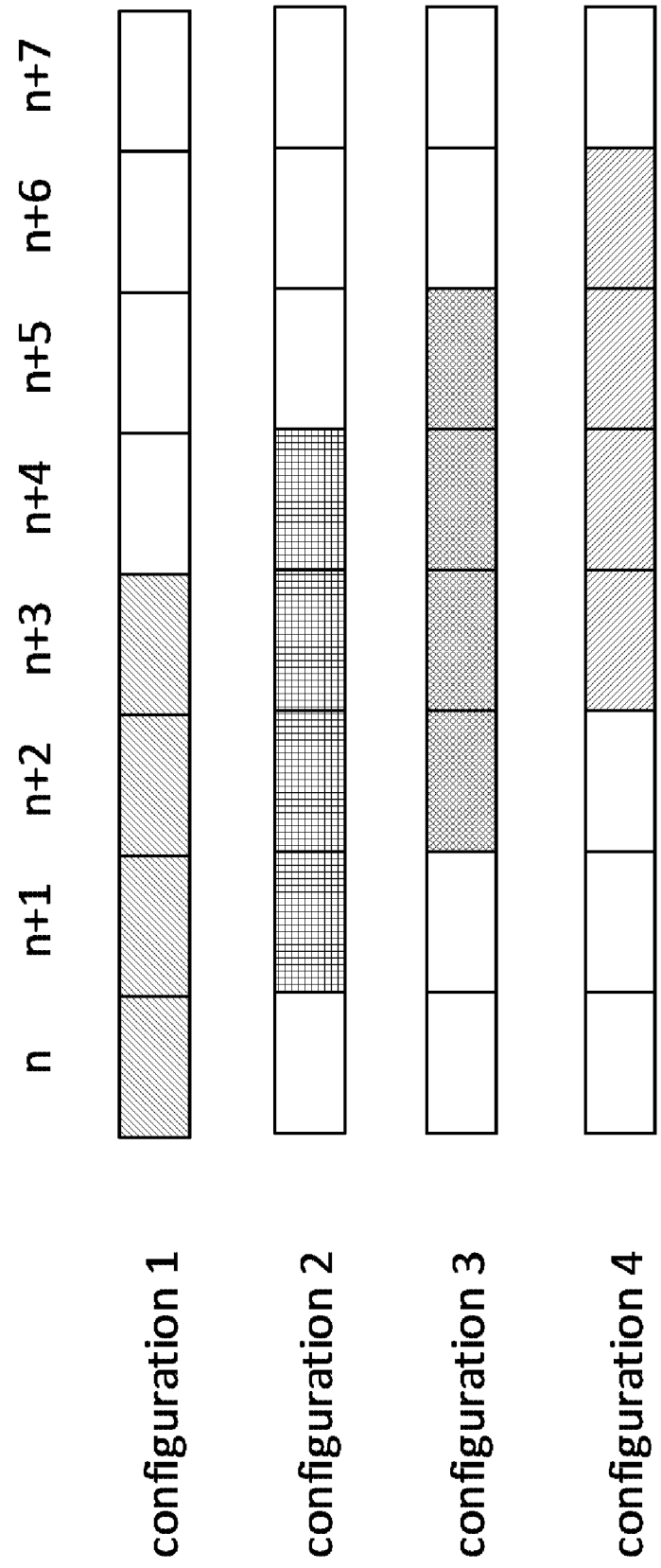
FIG. 3 is an example of four configured grants where each configured grant partially overlaps the others.

Another solution would be to configure multiple active configured grant configurations within a cell/Bandwidth Part (BWP) where each configuration partially overlaps and the UE can choose to transmit on any transmission occasion depending on when the data arrives at the buffer. FIG. 3 is an example of four configurations.

The activation of multiple configured grant configurations is already supported in LTE. However, the activation of multiple configured grant configurations comes with some complexities. As one part of the solution, a disjoint Hybrid Automatic Repeat Request (HARQ) process Identifier (ID) pool is allocated to each configured grant. This means that this scheme requires a high number of HARQ processes, which is limited to sixteen (16) HARQ processes (see, e.g., 3GPP TS 38.331). Also, if the NR Node B (gNB) is allocated different configurations per UE, the UE needs to indicate which configuration it is using by an explicit field or implicitly by a different cyclic shift in the Demodulation Reference Signal (DMRS).

Certain aspects of the present disclosure and their embodiments may provide solutions to these or other challenges. Embodiments of the present disclosure provide a solution(s) that enables an efficient support of an intra-UE mixed traffic scenario. In some embodiments, the solution is divided into the following steps:
1. Introduce several discrete points within the originally allocated configured grant resources so that data can be sent at each discrete point. Preferably, the gNB decodes uplink transmission at every discrete point within the allocated resources. Also, to avoid longer transmission time, the configured grant introduces an interval time that the UE should send the TSN LCH within its border.
2. Introduce that the original Cell Group (CG) restrictions on non-TSN/URLLC LCHs can be removed after a period, delta, if TSN did not arrive or after TSN is transmitted.

Certain embodiments may provide one or more of the following technical advantage(s). Using embodiments of the present disclosure, the network will be able to:
 Tackle the problem of misalignment of arrival of deterministic TSN traffic under intra-UE mixed traffic.
 Address the problem of high number of HARQ processes.
 Address the problem of low spectral efficiency of the mixed services solution.

The following description of embodiments of the present disclosure is divided into several sections to facilitate the illustration.

Note that hereafter, the word "critical traffic" is used to refer to TSN/URLLC traffic.

Enabling Mid-PUSCH Transmission Even Under Un-Met PUSCH Preparation Time

A configured uplink grant for a UE allocates uplink resources for uplink transmissions by the UE in multiple transmission time intervals. For instance, in each of the examples illustrated in FIGS. 1 and 2 discussed above, four transmission time intervals are illustrated. These transmission time intervals are also referred to herein as "transmission occasions" or "transmission opportunities." Rather than allowing uplink transmissions to begin only at the start of a transmission time interval of the configured uplink grant, embodiments are described herein that enable uplink transmissions to begin at any point or any one of a number of discrete points within a transmission time interval. For instance, assume that a UE has a configured uplink grant and critical data arrives at the UE (i.e., the UE determines that there is critical data to be transmitted on the configured uplink grant) at a time for which the preparation time (also referred to herein as PUSCH preparation time) is not satisfied (i.e., the time, $t_{arrival}$, at which the UE determines that there is critical data to be transmitted plus the Preparation Time (PT) is after the start of the next transmission time interval of the configured uplink grant). Then, using what is referred to herein as a mid-PUSCH transmission, the UE transmits an uplink transmission comprising the critical data starting at some point during that transmission time interval that occurs at or after $t_{arrival}$+PT.

In one embodiment, a UE can start a mid-PUSCH transmission at any Orthogonal Frequency Division Multiplexing (OFDM) symbol during any of the allocated PUSCH transmission resources within a transmission time interval of a configured uplink grant for the UE.

In some other embodiments of a mid-PUSCH transmission, a transmission time interval of the configured uplink grant is divided into several smaller grants at each of two or more sub-occasions within a larger grant. In other words, each transmission time interval of the configured uplink grant is sub-divided into a number of sub-occasions (also referred to herein as sub-intervals). Then, the UE can perform an uplink transmission starting at the start of any of the sub-occasions. For example, again assume that a UE has a configured uplink grant and critical data arrives at the UE (i.e., the UE determines that there is critical data to be transmitted on the configured uplink grant) at a time for which the preparation time (also referred to herein as PUSCH preparation time) is not satisfied (i.e., the time, $t_{arrival}$, at which the UE determines that there is critical data to be transmitted plus the PT is after the start of the next transmission time interval of the configured uplink grant). Then, using a mid-PUSCH transmission, the UE transmits an uplink transmission comprising the critical data starting at the start of a sub-occasion within that transmission time interval that occurs at or after $t_{arrival}+PT$ (e.g., start the transmission at the first sub-occasion that starts after the time $t_{arrival}+PT$).

Figure 4:
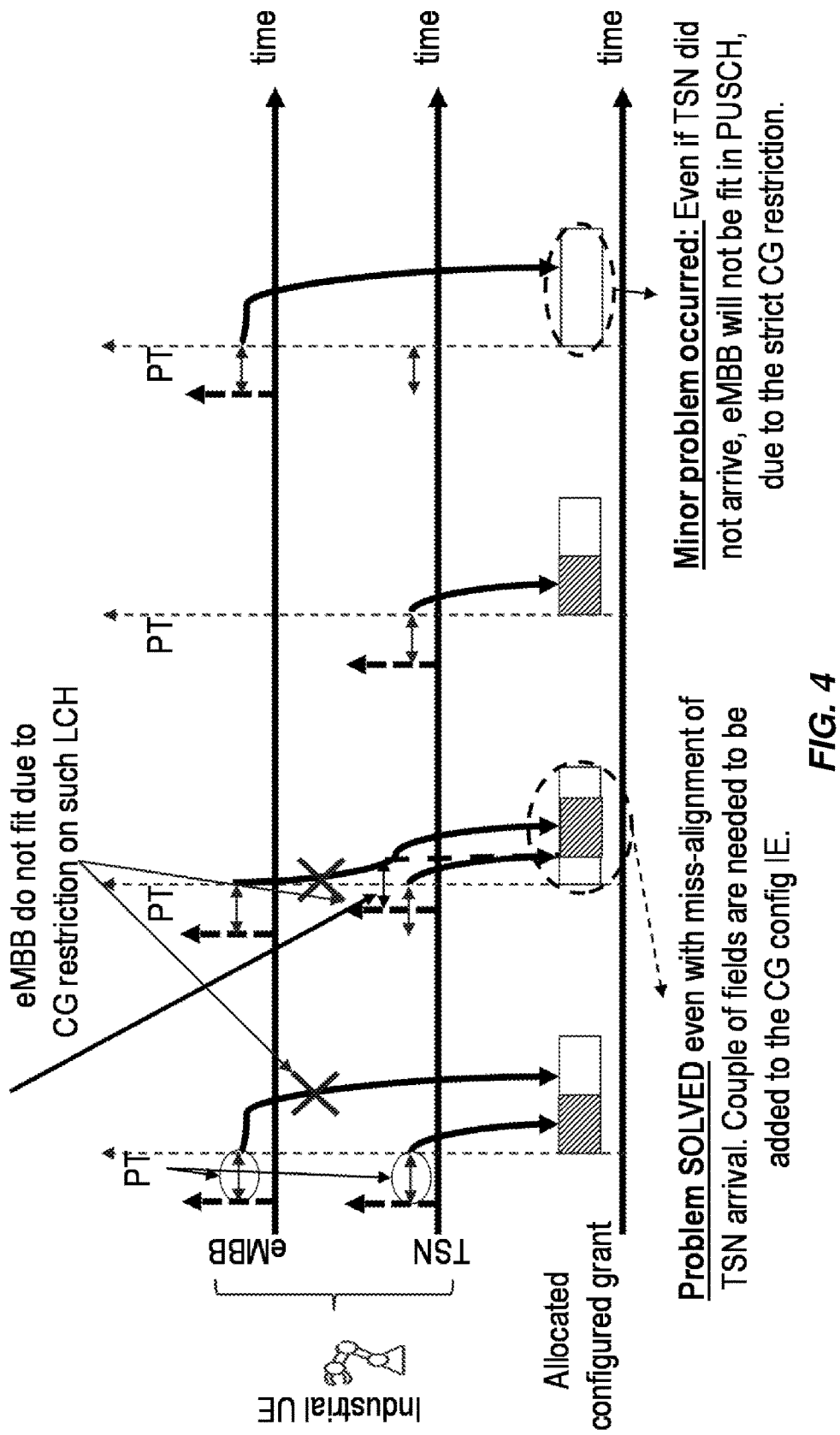
FIG. 4 illustrates an example of a mid-PUSCH transmission for TSN traffic in accordance with some embodiments of the present disclosure.

FIG. 4 illustrates an example of a mid-PUSCH transmission for TSN traffic. When using a mid-PUSCH transmission, the scenario in the second opportunity illustrated in the example of FIG. 4 shows that within the processing time limit, a UE can send the MAC Protocol Data Unit (PDU) to the PHY layer and the PHY layer can transmit on valid PUSCH resources.

In another follow-up embodiment, the HARQ process is the same regardless of when the transmission starts.

Some issues in this section are described as follows:
At the fourth opportunity in the example of FIG. 4, the eMBB is not transmitted in the available resources because of a restriction, even if TSN did not really arrive.
At the gNB, the gNB has to look for all possible sub-occasions within the PUSCH time (continuously), which requires a substantial amount of gNB processing because of the intensive decoding requirement.

The above two issues will be addressed by embodiments of the present disclosure described in the following section.

Enhancements to gNB Processing and Network Spectral Efficiency

Figure 5:
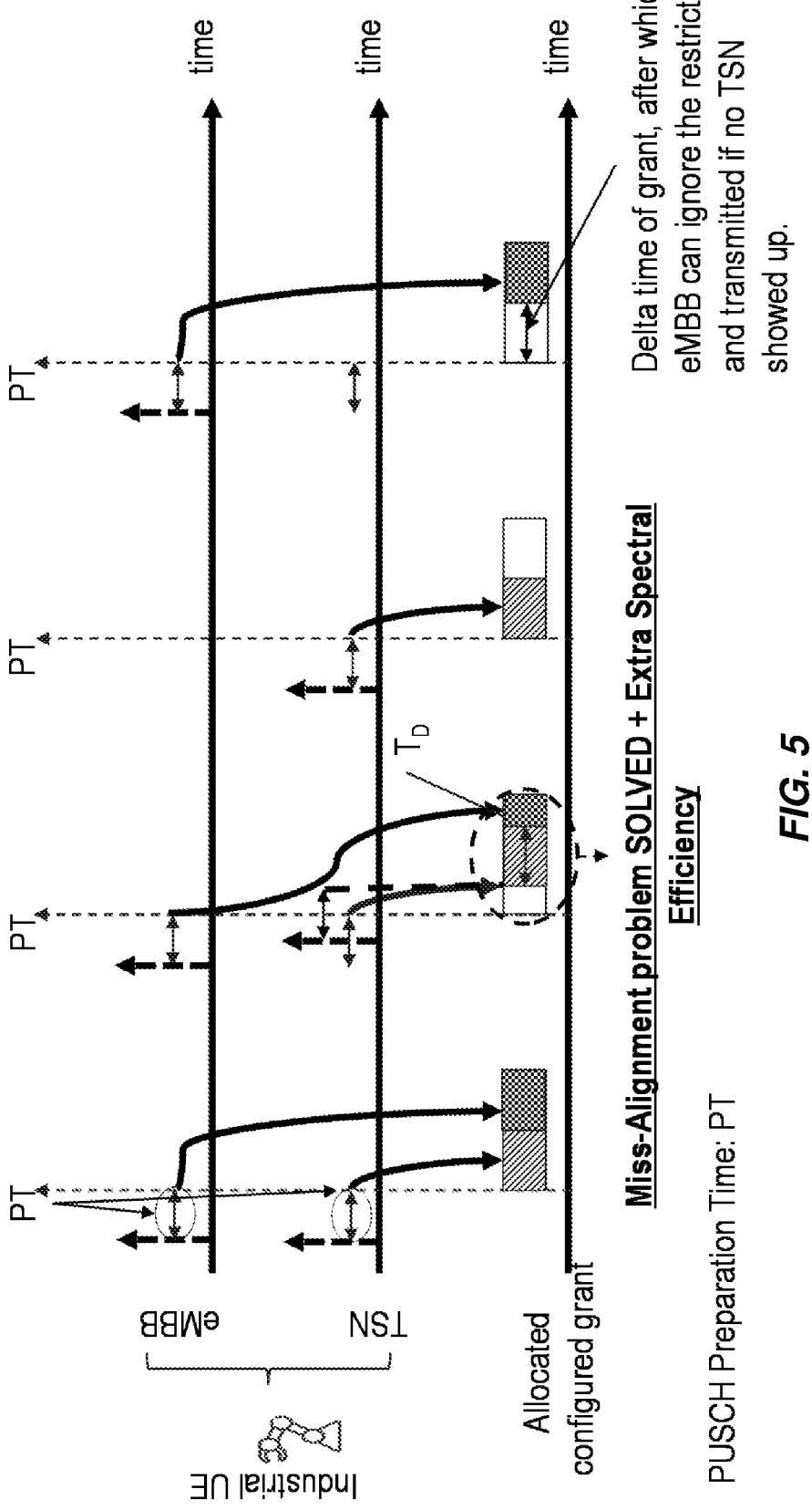
FIG. 5 illustrates a number of enhancements to the mid-PUSCH transmission for TSN traffic of FIG. 4 in accordance with some embodiments of the present disclosure.

In this section, three new enhancements to restriction on non-critical traffic are provided. The enhancements are illustrated in FIG. 5, which illustrates enhancements for spectral efficiency and gNB decoding sub-occasions.

In one embodiment, the configured grant restriction is updated into a temporal restriction. That is, if configuredGrantType2Allowed=false and nonCriticalDelta is an integer (and not infinity), the UE waits for nonCriticalDelta OFDM symbols before it decides to transmit the non-critical LCH data. This behavior enhances the spectral efficiency as shown in the fourth opportunity in FIG. 5. Specifically, as shown in the fourth transmission opportunity in FIG. 5, no TSN LCH data has arrived prior to the start of the fourth transmission opportunity. However, eMBB data (which is non-critical LCH data) has arrived prior to the start of the fourth transmission opportunity. Since there is a configured grant restriction, the UE is initially restricted from transmitting the eMBB data at the start of the fourth transmission opportunity. However, the UE then waits for nonCriticalDelta OFDM symbols. If no TSN data is available and ready for transmission at that time, then the UE transmits the eMBB data in the remaining portion of the fourth transmission opportunity. As discussed above in the prior section, the UE may begin this mid-PUSCH transmission (of the eMBB data) starting at the nonCriticalDelta OFDM symbols after the start of the fourth transmission opportunity or begin this mid-PUSCH transmission (of the eMBB data) starting at the first sub-occasion at or after nonCriticalDelta OFDM symbols after the start of the fourth transmission occasion.

Another variant of this embodiment (referred to herein as a delta period) is that non-critical data can be sent after the UE has transmitted TSN traffic. This is illustrated in the second transmission opportunity in FIG. 5. This is clearly different from the current specification. Because the UE has to wait until the TSN arrival even if the grant time resources have started, or N2 is not enough to prepare the PUSCH of TSN. Then it sends the non-critical data.

One possible example of incorporating the above embodiments may be considered within the configuredGrantType1/2Allowed definition in the MAC specification as follows (in addition to several other modifications):

configuredGrantType1/2Allowed which sets whether a configured grant Type 1/2 can be used for transmission; is set to true if no data from logical channels with configuredGrantType1/2Allowed=true is transmitted on this configured grant (with longest duration among overlapping grants) for nonCriticalDelta OFDM symbols duration after the beginning of the configured grant (i.e., after the start of a particular transmission time interval of the configured grant) and set to true if deltaPeriod duration has expired since a potential transmission of critical data on this configured grant (i.e., on the particular transmission time interval of the configured grant).

Figure 6:
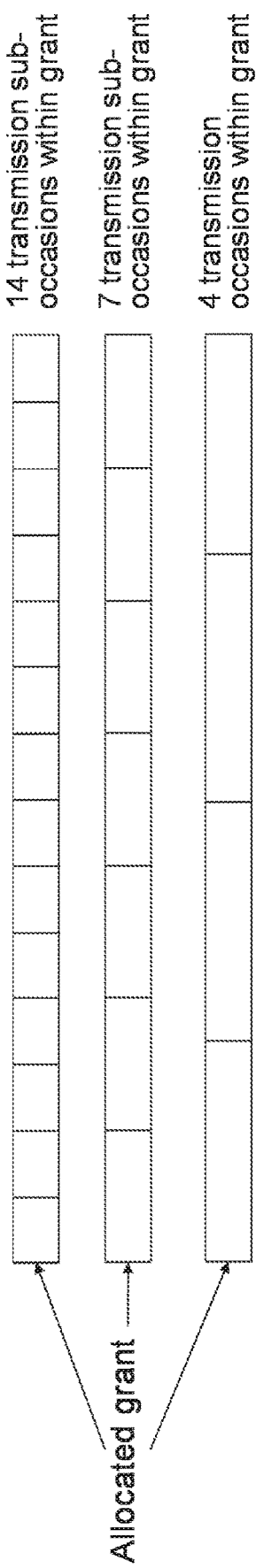
FIG. 6 illustrates examples of quantized transmission sub-occasions within a configured grant that may be checked by a base station to receive mid-PUSCH transmissions in accordance with some embodiments of the present disclosure.

In another embodiment, several quantized sub-occasions for the gNB to decode (i.e., monitor) for PUSCH within the allocated opportunity (i.e., within a transmission time interval of the configured uplink grant) are provided, as shown in FIG. 6. Several sub-occasions are presented as an example (14, 7, 4). Hence, the UE would be able to construct a MAC PDU at each sub-occasion. This can possibly be modeled as the "legacy" PUSCH occasion, where there would be one or more smaller grants/Transport Blocks (TBs) for the same HARQ process.

In another embodiment, a duration of transmission expected for critical traffic within the configured grant (since it has extra resources than required by critical data) is introduced. The time is configured by, e.g., Radio Resource Control (RRC). This duration is illustrated in the second opportunity of FIG. 5. Such duration, called $T_D$, enables the UE/gNB to keep the latency of the TSN traffic limited. Also, it helps the UE to expect/prepare for the non-critical traffic transmission within the grant, while the critical transmission is pushed to the channel.

In one embodiment, the delta period during which UE waits for critical data before transmitting non-critical data is configured to be at least K*L OFDM symbols where K is the number of configured repetitions (repK) and L is the PUSCH duration of each repetition of critical data transmission.

In another embodiment, the delta period is configured to be at least K*14 OFDM symbols where K is the number of configured repetitions (repK).

In one embodiment, time domain resource allocation (starting symbol/slot and length) of non-critical data when transmitted after the critical data according to the above embodiment is obtained according to some rule based on the delta period and available configured resources after the delta period.

For example, in the second opportunity shown in FIG. 5, time domain allocation of eMBB data transmission is modified from the preconfigured value due to the delay period and TSN transmission. The starting symbol and/or slot of eMBB transmission is the immediate symbol and/or slot after the delta period, and the transmission duration is equal to min(LeMBB, remaining OFDM symbols within the configured grant resource after delta period), where LeMBB is the preconfigured eMBB transmission duration. The new time domain allocation of eMBB transmission is known implicitly at the gNB.

Such proposal comes with some changes to the specification. For instance, TS 38.331 might require the following changes:
timeTransmissionDuration: represent the duration needed for critical data transmission with in the grant, above called M.
tranmissionOccasionsInGrant: represent the number of sub-occasions that the UE can transmit on within the grant, and the gNB should expect to receive PUSCH starts.

nonCriticalDelta: the interval delay that a non-critical LCH has to wait before a UE declares that there is no TSN LCH arriving.

An example of such changes is described in the following ASN1 code of ConfiguredGrantConfig Information Element (IE).

```
-- ASN1START
-- TAG-CONFIGUREDGRANTCONFIG-START
ConfiguredGrantConfig ::=        SEQUENCE {
    frequencyHopping             ENUMERATED
{intraSlot, interSlot}
OPTIONAL,  -- Need S,
    cg-DMRS-Configuration        DMRS-UplinkConfig,
    mcs-Table                    ENUMERATED {qam256,
qam64LowSE}                      OPTIONAL,  -- Need S
    mcs-TableTransformPrecoder   ENUMERATED {qam256,
qam64LowSE}                      OPTIONAL,  -- Need S
    uci-OnPUSCH                  SetupRelease { CG-UCI-
OnPUSCH }                                    OPTIONAL,  --
Need M
    resourceAllocation           ENUMERATED {
resourceAllocationType0, resourceAllocationType1, dynamicSwitch
},
    rbg-Size                     ENUMERATED {config2}
OPTIONAL,  -- Need S
    powerControlLoopToUse        ENUMERATED {n0, n1},
    p0-PUSCH-Alpha               P0-PUSCH-AlphaSetId,
    transformPrecoder            ENUMERATED {enabled,
disabled}                                    OPTIONAL,  --
Need S
    nrofHARQ-Processes           INTEGER (1...16),
    repK                         ENUMERATED {n1, n2,
n4, n8},
    repK-RV                      ENUMERATED {s1-0231, s2-
0303, S3-0000}                   OPTIONAL,  -- Need R
    periodicity                  ENUMERATED {
                                     sym2, sym7,
sym1x14, sym2x14, sym4x14, sym5x14, sym8x14, sym10x14, sym16x14,
sym20x14,
sym32x14
sym40x14, sym64x14, sym80x14, sym128x14, sym160x14, sym256x14,
sym320x14, sym512x14,
                                     sym640x14,
sym1024x14, sym1280x14, sym2560x14, sym5120x14,
                                     sym6, sym1x12,
sym2x12, sym4x12, sym5x12, sym8x12, sym10x12, sym16x12, sym20x12, sym32x12,
                                     sym40x12,
sym64x12, sym80x12, sym128x12, sym160x12, sym256x12, sym320x12,
sym512x12, sym640x12,
                                     sym1280x12,
sym2560x121
    },
    configuredGrantTimer         INTEGER (1...64)
OPTIONAL,  -- Need R
    rrc-ConfiguredUplinkGrant    SEQUENCE {
        timeDomainOffset             INTEGER
(0...5119),
        timeDomainAllocation         INTEGER
(0...15),
        timeTransmissionDuration         INTEGER
(0...15),
        tranmissionOccasionsInGrant      INTEGER
(0...maxAllowableTxOccassions) ,
        nonCriticalDelta                 INTEGER
(0...maxAllowableDelta),
        frequencyDomainAllocation        BIT STRING
(SIZE(18)),
        antennaPort                  INTEGER (0...31),
        dmrs-SeqInitialization       INTEGER (0...1)
OPTIONAL,  -- Need R
        precodingAndNumberOfLayers   INTEGER (0...63),
        srs-ResourceIndicator        INTEGER (0...15)
OPTIONAL,  -- Need R
        mcsAndTBS                    INTEGER (0...31),
        frequencyHoppingOffset       INTEGER (1...
maxNrofPhysicalResourceBlocks-1) OPTIONAL,  -- Need R
        pathlossReferenceIndex       INTEGER
(0...maxNrofPUSCH-PathlossReferenceRSs-1) ,
        ...
    }
OPTIONAL,      -- Need R
    ...
```

```
}
CG-UCI-OnPUSCH ::= CHOICE {
    dynamic                           SEQUENCE (SIZE
(1...4)) OF BetaOffsets,
    semiStatic                        BetaOffsets
}
-- TAG-CONFIGUREDGRANTCONFIG-STOP
-- ASN1STOP
```

In an alternative embodiment, the parameter "tranmissionOccasionsInGrant" is removed from ConfiguredGrantConfig IE and replaced with "tranmissionOccasionsInGrant"=8, 6, 4, 2, or 0 OFDM symbols in "LogicalChannelConfig information element", as highlighted below.

sub-occasions in a transmission time interval of the configured grant. In this case, the scheduler (i.e., the MAC layer at the UE) may prepare and trigger short non-critical transmissions one-by-one until the critical data transmission appears in the buffer. This can be illustrated by the example in FIG. 7. Thus, as illustrated, if the critical data transmis-

```
-- ASN1START
-- TAG-LOGICAL-CHANNEL-CONFIG-START
LogicalChannelConfig ::=              SEQUENCE {
    ul-SpecificParameters             SEQUENCE {
        priority                      INTEGER (1...16),
        prioritisedBitRate            ENUMERATED {kBps0,
kBps8, kBps16, kBps32, kBps64, kBps128, kBps256, kBps512,
                                      kBps1024, kBps2048,
kBps4096, kBps8192, kBps16384, kBps32768, kBps65536, infinity},
        bucketSizeDuration            ENUMERATED {ms5,
ms10, ms20, ms50, ms100, ms150, ms300, ms500, ms1000,
spare7, spare6, spare5, spare4, spare3, spare2, spare1},
        allowedServingCells           SEQUENCE (SIZE
(1...maxNrofServingCells-1)) OF ServCellIndex
OPTIONAL,  -- PDCP-CADuplication
        allowedSCS-List               SEQUENCE (SIZE
(1...maxSCSs)) OF SubcarrierSpacing
OPTIONAL,  -- Need R
        maxPUSCH-Duration             ENUMERATED { ms0p02,
ms0p04, ms0p0625, ms0p125, ms0p25, ms0p5, spare2, spare1 }
OPTIONAL,  -- Need R
        configuredGrantType1Allowed   ENUMERATED {true}
OPTIONAL,  -- Need R
        logicalChannelGroup           INTEGER (0...maxLCG-
ID)
OPTIONAL,  -- Need R
        schedulingRequestID           SchedulingRequestId
OPTIONAL,  -- Need R
        logicalChannelSR-Mask         BOOLEAN,
        logicalChannelSR-DelayTimerApplied  BOOLEAN,
        ...,
        bitRateQueryProhibitTimer     ENUMERATED { s0, s0dot4,
s0dot8, s1dot6, s3, s6, s12, s30}    OPTIONAL
-- Need R
    }
OPTIONAL,  -- Cond UL
tranmissionOccasionsInGrant           INTEGER   (0,2,4,8),
    ...
}
-- TAG-LOGICAL-CHANNEL-CONFIG-STOP
-- ASN1STOP
```

Then, the starting OFDM symbol for transmission can be calculated as follows, at slot t:
TSN (critical) LCH→t+tranmissionOccasionsInGrant.
eMBB (non-critical) LCH→t+tranmissionOccasionsInGrant+nonCriticalDelta; where tranmissionOccasionsInGrant=0 for the non-critical traffic.

This alternative solution differs from the previous one by the fact that he "tranmissionOccasionsInGrant" does not need to be allocated at each grant (Dynamic, configured Type 1 or 2), but only at each LCH.

Considering an even more efficient scheme, another embodiment is when the scheduler can send non-critical data before critical data if there are a plurality of transmission sion is not ready for transmission until the third sub-occasion of the transmission grant and spans four sub-occasions, non-critical data can be transmitted in the first two sub-occasions of the transmission grant prior to the transmission of the critical data, and non-critical data can also be transmitted in remaining sub-occasions that occur after the transmission of the critical data.

Figure 8:
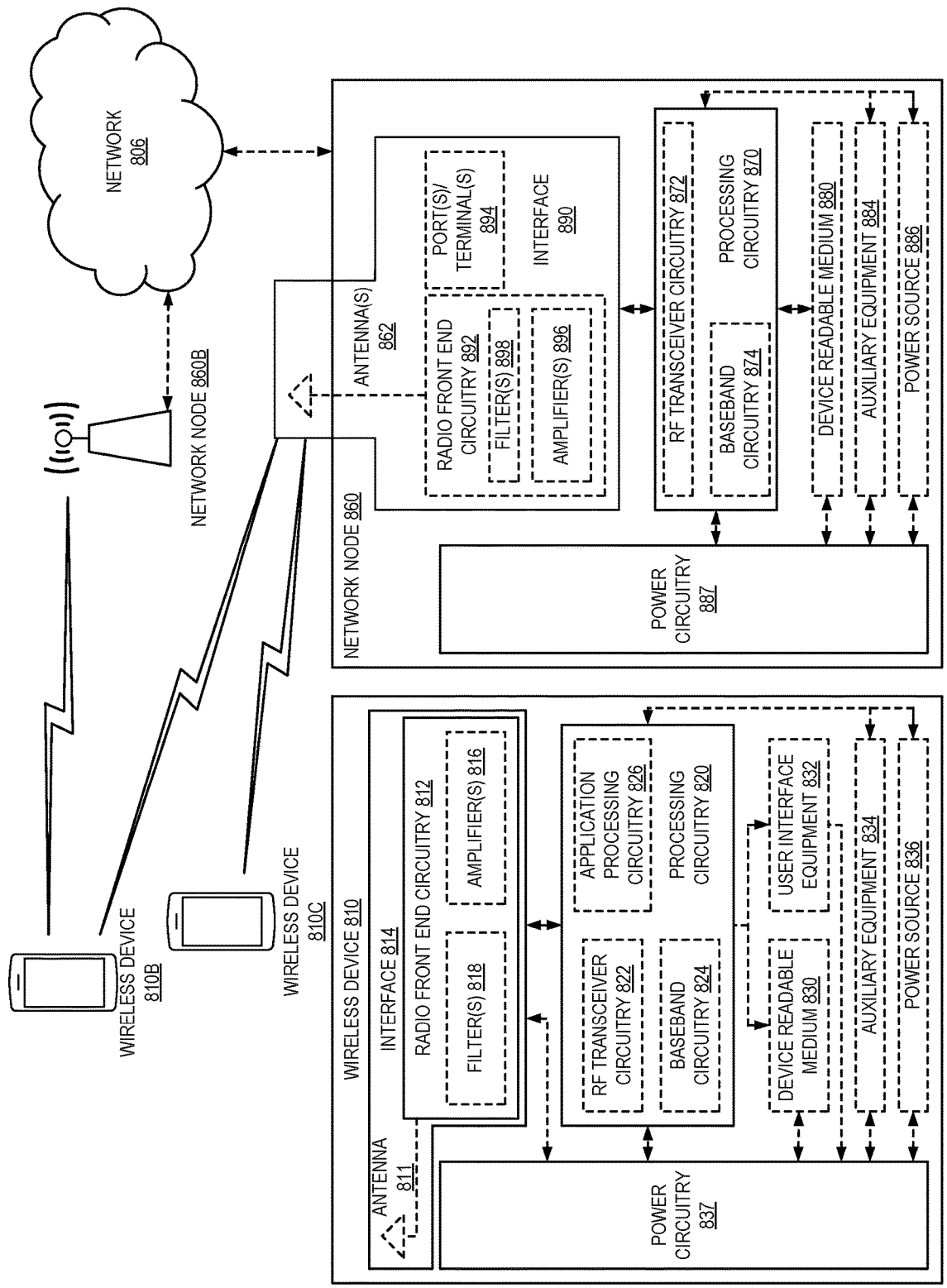
FIG. 8 illustrates an example wireless network in which embodiments of the present disclosure may be implemented.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts a network 806, network nodes 860 and 860B, and Wireless Devices (WDs) 810, 810B, and 810C. In practice, a wireless network may further include any additional elements suitable to support communication between wireless devices or between a wireless device and another communication device, such as a landline telephone, a service provider, or any other network node or end device. Of the illustrated components, the network node 860 and the WD 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, and/or other suitable Second, Third, Fourth, or Fifth Generation (2G, 3G, 4G, or 5G) standards (e.g., NR); Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

The network 806 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

The network node 860 and the WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio APs), Base Stations (BSs) (e.g., radio base stations, Node Bs, evolved Node Bs (eNBs), and gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or BS Controllers (BSCs), Base Transceiver Stations (BTSs), transmission points, transmission nodes, Multi-Cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, the network node 860 includes processing circuitry 870, a device readable medium 880, an interface 890, auxiliary equipment 884, a power source 886, power circuitry 887, and an antenna 862. Although the network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 860 are depicted as single boxes located within a larger box, or nested within multiple boxes, in practice, a network node may comprise multiple different physical components that make up a single illustrated component (e.g., the device readable medium 880 may comprise multiple separate hard drives as well as multiple Random Access Memory (RAM) modules).

Similarly, the network node 860 may be composed of multiple physically separate components (e.g., a Node B component and a RNC component, or a BTS component and a BSC component, etc.), which may each have their own respective components. In certain scenarios in which the network node 860 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 860 may be configured to support multiple Radio Access Technologies (RATs). In such embodiments, some components may be duplicated (e.g., a separate device readable medium 880 for the different RATs) and some components may be reused (e.g., the same antenna 862 may be shared by the RATs). The network node 860 may also include multiple sets of the various illustrated components for different wireless technologies integrated into the network node 860, such as, for example, GSM, Wideband Code Division Multiple Access (WCDMA), LTE, NR, WiFi, or Bluetooth wireless technologies. These wireless technologies may be integrated into the same or a different chip or set of chips and other components within the network node 860.

The processing circuitry 870 is configured to perform any determining, calculating, or similar operations (e.g., certain obtaining operations) described herein as being provided by a network node. These operations performed by the processing circuitry 870 may include processing information obtained by the processing circuitry 870 by, for example, converting the obtained information into other information, comparing the obtained information or converted information to information stored in the network node, and/or performing one or more operations based on the obtained information or converted information, and as a result of said processing making a determination.

The processing circuitry 870 may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide, either alone or in conjunction with other network node 860 components, such as the device readable medium 880, network node 860 functionality. For example, the processing circuitry 870 may execute instructions stored in the device readable medium 880 or in memory within the processing circuitry 870. Such functionality may include providing any of the various wireless features, functions, or benefits discussed herein. In some embodiments, the processing circuitry 870 may include a System on a Chip (SOC).

In some embodiments, the processing circuitry 870 may include one or more of Radio Frequency (RF) transceiver circuitry 872 and baseband processing circuitry 874. In some embodiments, the RF transceiver circuitry 872 and the baseband processing circuitry 874 may be on separate chips (or sets of chips), boards, or units, such as radio units and digital units. In alternative embodiments, part or all of the RF transceiver circuitry 872 and the baseband processing circuitry 874 may be on the same chip or set of chips, boards, or units.

In certain embodiments, some or all of the functionality described herein as being provided by a network node, base station, eNB, or other such network device (e.g., gNB) may be performed by the processing circuitry 870 executing instructions stored on the device readable medium 880 or memory within the processing circuitry 870. In alternative embodiments, some or all of the functionality may be provided by the processing circuitry 870 without executing instructions stored on a separate or discrete device readable medium, such as in a hard-wired manner. In any of those embodiments, whether executing instructions stored on a device readable storage medium or not, the processing circuitry 870 can be configured to perform the described functionality. The benefits provided by such functionality are not limited to the processing circuitry 870 alone or to other components of the network node 860, but are enjoyed by the network node 860 as a whole, and/or by end users and the wireless network generally.

The device readable medium 880 may comprise any form of volatile or non-volatile computer readable memory including, without limitation, persistent storage, solid state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 870. The device readable medium 880 may store any suitable instructions; data or information, including a computer program; software; an application including one or more of logic, rules, code, tables, etc.; and/or other instructions capable of being executed by the processing circuitry 870 and utilized by the network node 860. The device readable medium 880 may be used to store any calculations made by the processing circuitry 870 and/or any data received via the interface 890. In some embodiments, the processing circuitry 870 and the device readable medium 880 may be considered to be integrated.

The interface 890 is used in the wired or wireless communication of signaling and/or data between the network node 860, a network 806, and/or WDs 810. As illustrated, the interface 890 comprises port(s)/terminal(s) 894 to send and receive data, for example to and from the network 806 over a wired connection. The interface 890 also includes radio front end circuitry 892 that may be coupled to, or in certain embodiments a part of, the antenna 862. The radio front end circuitry 892 comprises filters 898 and amplifiers 896. The radio front end circuitry 892 may be connected to the antenna 862 and the processing circuitry 870. The radio front end circuitry 892 may be configured to condition signals communicated between the antenna 862 and the processing circuitry 870. The radio front end circuitry 892 may receive digital data that is to be sent out to other network nodes or WDs via a wireless connection. The radio front end circuitry 892 may convert the digital data into a radio signal having the appropriate channel and bandwidth parameters using a combination of the filters 898 and/or the amplifiers 896. The radio signal may then be transmitted via the antenna 862. Similarly, when receiving data, the antenna 862 may collect radio signals which are then converted into digital data by the radio front end circuitry 892. The digital data may be passed to the processing circuitry 870. In other embodiments, the interface 890 may comprise different components and/or different combinations of components.

In certain alternative embodiments, the network node 860 may not include separate radio front end circuitry 892; instead, the processing circuitry 870 may comprise radio front end circuitry and may be connected to the antenna 862 without separate radio front end circuitry 892. Similarly, in some embodiments, all or some of the RF transceiver circuitry 872 may be considered a part of the interface 890. In still other embodiments, the interface 890 may include the one or more ports or terminals 894, the radio front end circuitry 892, and the RF transceiver circuitry 872 as part of a radio unit (not shown), and the interface 890 may communicate with the baseband processing circuitry 874, which is part of a digital unit (not shown).

The antenna 862 may include one or more antennas, or antenna arrays, configured to send and/or receive wireless signals. The antenna 862 may be coupled to the radio front end circuitry 892 and may be any type of antenna capable of transmitting and receiving data and/or signals wirelessly. In some embodiments, the antenna 862 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 862 may be separate from the network node 860 and may be connectable to the network node 860 through an interface or port.

The antenna 862, the interface 890, and/or the processing circuitry 870 may be configured to perform any receiving operations and/or certain obtaining operations described herein as being performed by a network node. Any information, data, and/or signals may be received from a WD, another network node, and/or any other network equipment. Similarly, the antenna 862, the interface 890, and/or the processing circuitry 870 may be configured to perform any transmitting operations described herein as being performed by a network node. Any information, data, and/or signals may be transmitted to a WD, another network node, and/or any other network equipment.

The power circuitry 887 may comprise, or be coupled to, power management circuitry and is configured to supply the components of the network node 860 with power for performing the functionality described herein. The power circuitry 887 may receive power from the power source 886. The power source 886 and/or the power circuitry 887 may be configured to provide power to the various components of the network node 860 in a form suitable for the respective components (e.g., at a voltage and current level needed for each respective component). The power source 886 may either be included in, or be external to, the power circuitry 887 and/or the network node 860. For example, the network node 860 may be connectable to an external power source (e.g., an electricity outlet) via an input circuitry or interface such as an electrical cable, whereby the external power source supplies power to the power circuitry 887. As a further example, the power source 886 may comprise a source of power in the form of a battery or battery pack which is connected to, or integrated in, the power circuitry 887. The battery may provide backup power should the external power source fail. Other types of power sources, such as photovoltaic devices, may also be used.

Alternative embodiments of the network node 860 may include additional components beyond those shown in FIG. 8 that may be responsible for providing certain aspects of the network node's functionality, including any of the functionality described herein and/or any functionality necessary to support the subject matter described herein. For example, the network node 860 may include user interface equipment to allow input of information into the network node 860 and to allow output of information from the network node 860. This may allow a user to perform diagnostic, maintenance, repair, and other administrative functions for the network node 860.

As used herein, WD refers to a device capable, configured, arranged, and/or operable to communicate wirelessly with network nodes and/or other WDs. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, etc. A WD may support Device-to-Device (D2D) communication, for example by implementing a 3GPP standard for sidelink communication, Vehicle-to-Vehicle (V2V), Vehicle-to-Infrastructure (V2I), Vehicle-to-Everything (V2X), and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine-Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 8, a WD 810 includes an antenna 811, an interface 814, processing circuitry 820, a device readable medium 830, user interface equipment 832, auxiliary equipment 834, a power source 836, and power circuitry 837. The WD 810 may include multiple sets of one or more of the illustrated components for different wireless technologies supported by the WD 810, such as, for example, GSM, WCDMA, LTE, NR, WiFi, WiMAX, or Bluetooth wireless technologies, just to mention a few. These wireless technologies may be integrated into the same or different chips or set of chips as other components within the WD 810.

The antenna 811 may include one or more antennas or antenna arrays configured to send and/or receive wireless signals and is connected to the interface 814. In certain alternative embodiments, the antenna 811 may be separate from the WD 810 and be connectable to the WD 810 through an interface or port. The antenna 811, the interface 814, and/or the processing circuitry 820 may be configured to perform any receiving or transmitting operations described herein as being performed by a WD. Any information, data, and/or signals may be received from a network node and/or another WD. In some embodiments, radio front end circuitry and/or the antenna 811 may be considered an interface.

As illustrated, the interface 814 comprises radio front end circuitry 812 and the antenna 811. The radio front end circuitry 812 comprises one or more filters 818 and amplifiers 816. The radio front end circuitry 812 is connected to the antenna 811 and the processing circuitry 820 and is configured to condition signals communicated between the antenna 811 and the processing circuitry 820. The radio front end circuitry 812 may be coupled to or be a part of the antenna 811. In some embodiments, the WD 810 may not include separate radio front end circuitry 812; rather, the processing circuitry 820 may comprise radio front end circuitry and may be connected to the antenna 811. Similarly, in some embodiments, some or all of RF transceiver circuitry 822 may be considered a part of the interface 814. The radio front end circuitry 812 may receive digital data that is to be sent out to other network nodes or WDs via a wireless connection. The radio front end circuitry 812 may convert the digital data into a radio signal having the appropriate channel and bandwidth parameters using a combination of the filters 818 and/or the amplifiers 816. The radio signal may then be transmitted via the antenna 811. Similarly, when receiving data, the antenna 811 may collect radio signals which are then converted into digital data by the radio front end circuitry 812. The digital data may be passed to the processing circuitry 820. In other embodiments, the interface 814 may comprise different components and/or different combinations of components.

The processing circuitry 820 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other WD 810 components, such as the device readable medium 830, WD 810 functionality. Such functionality may include providing any of the various wireless features or benefits discussed herein. For example, the processing circuitry 820 may execute instructions stored in the device readable medium 830 or in memory within the processing circuitry 820 to provide the functionality disclosed herein.

As illustrated, the processing circuitry 820 includes one or more of the RF transceiver circuitry 822, baseband processing circuitry 824, and application processing circuitry 826. In other embodiments, the processing circuitry 820 may comprise different components and/or different combinations of components. In certain embodiments, the processing circuitry 820 of the WD 810 may comprise a SOC. In some embodiments, the RF transceiver circuitry 822, the baseband processing circuitry 824, and the application processing circuitry 826 may be on separate chips or sets of chips. In alternative embodiments, part or all of the baseband processing circuitry 824 and the application processing circuitry 826 may be combined into one chip or set of chips, and the RF transceiver circuitry 822 may be on a separate chip or set of chips. In still alternative embodiments, part or all of the RF transceiver circuitry 822 and the baseband processing circuitry 824 may be on the same chip or set of chips, and the application processing circuitry 826 may be on a separate chip or set of chips. In yet other alternative embodiments, part or all of the RF transceiver circuitry 822, the baseband processing circuitry 824, and the application processing circuitry 826 may be combined in the same chip or set of chips. In some embodiments, the RF transceiver circuitry 822 may be a part of the interface 814. The RF transceiver circuitry 822 may condition RF signals for the processing circuitry 820.

In certain embodiments, some or all of the functionality described herein as being performed by a WD may be provided by the processing circuitry 820 executing instructions stored on the device readable medium 830, which in certain embodiments may be a computer-readable storage medium. In alternative embodiments, some or all of the functionality may be provided by the processing circuitry 820 without executing instructions stored on a separate or discrete device readable storage medium, such as in a hard-wired manner. In any of those particular embodiments, whether executing instructions stored on a device readable storage medium or not, the processing circuitry 820 can be configured to perform the described functionality. The benefits provided by such functionality are not limited to the processing circuitry 820 alone or to other components of the WD 810, but are enjoyed by the WD 810 as a whole, and/or by end users and the wireless network generally.

The processing circuitry 820 may be configured to perform any determining, calculating, or similar operations (e.g., certain obtaining operations) described herein as being performed by a WD. These operations, as performed by the processing circuitry 820, may include processing information obtained by the processing circuitry 820 by, for example, converting the obtained information into other information, comparing the obtained information or converted information to information stored by the WD 810, and/or performing one or more operations based on the obtained information or converted information, and as a result of said processing making a determination.

The device readable medium 830 may be operable to store a computer program; software; an application including one or more of logic, rules, code, tables, etc.; and/or other instructions capable of being executed by the processing circuitry 820. The device readable medium 830 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by the processing circuitry 820. In some embodiments, the processing circuitry 820 and the device readable medium 830 may be considered to be integrated.

The user interface equipment 832 may provide components that allow for a human user to interact with the WD 810. Such interaction may be of many forms, such as visual, audial, tactile, etc. The user interface equipment 832 may be operable to produce output to the user and to allow the user to provide input to the WD 810. The type of interaction may vary depending on the type of user interface equipment 832 installed in the WD 810. For example, if the WD 810 is a smart phone, the interaction may be via a touch screen; if the WD 810 is a smart meter, the interaction may be through a screen that provides usage (e.g., the number of gallons used) or a speaker that provides an audible alert (e.g., if smoke is detected). The user interface equipment 832 may include input interfaces, devices and circuits, and output interfaces, devices and circuits. The user interface equipment 832 is configured to allow input of information into the WD 810, and is connected to the processing circuitry 820 to allow the processing circuitry 820 to process the input information. The user interface equipment 832 may include, for example, a microphone, a proximity or other sensor, keys/buttons, a touch display, one or more cameras, a Universal Serial Bus (USB) port, or other input circuitry. The user interface equipment 832 is also configured to allow output of information from the WD 810 and to allow the processing circuitry 820 to output information from the WD 810. The user interface equipment 832 may include, for example, a speaker, a display, vibrating circuitry, a USB port, a headphone interface, or other output circuitry. Using one or more input and output interfaces, devices, and circuits of the user interface equipment 832, the WD 810 may communicate with end users and/or the wireless network, and allow them to benefit from the functionality described herein.

The auxiliary equipment 834 is operable to provide more specific functionality which may not be generally performed by WDs. This may comprise specialized sensors for doing measurements for various purposes, interfaces for additional types of communication such as wired communications, etc. The inclusion and type of components of the auxiliary equipment 834 may vary depending on the embodiment and/or scenario.

The power source 836 may, in some embodiments, be in the form of a battery or battery pack. Other types of power sources, such as an external power source (e.g., an electricity outlet), photovoltaic devices, or power cells may also be used. The WD 810 may further comprise the power circuitry 837 for delivering power from the power source 836 to the various parts of the WD 810 which need power from the power source 836 to carry out any functionality described or indicated herein. The power circuitry 837 may in certain embodiments comprise power management circuitry. The power circuitry 837 may additionally or alternatively be operable to receive power from an external power source, in which case the WD 810 may be connectable to the external power source (such as an electricity outlet) via input circuitry or an interface such as an electrical power cable. The power circuitry 837 may also in certain embodiments be operable to deliver power from an external power source to the power source 836. This may be, for example, for the charging of the power source 836. The power circuitry 837 may perform any formatting, converting, or other modification to the power from the power source 836 to make the power suitable for the respective components of the WD 810 to which power is supplied.

Figure 9:
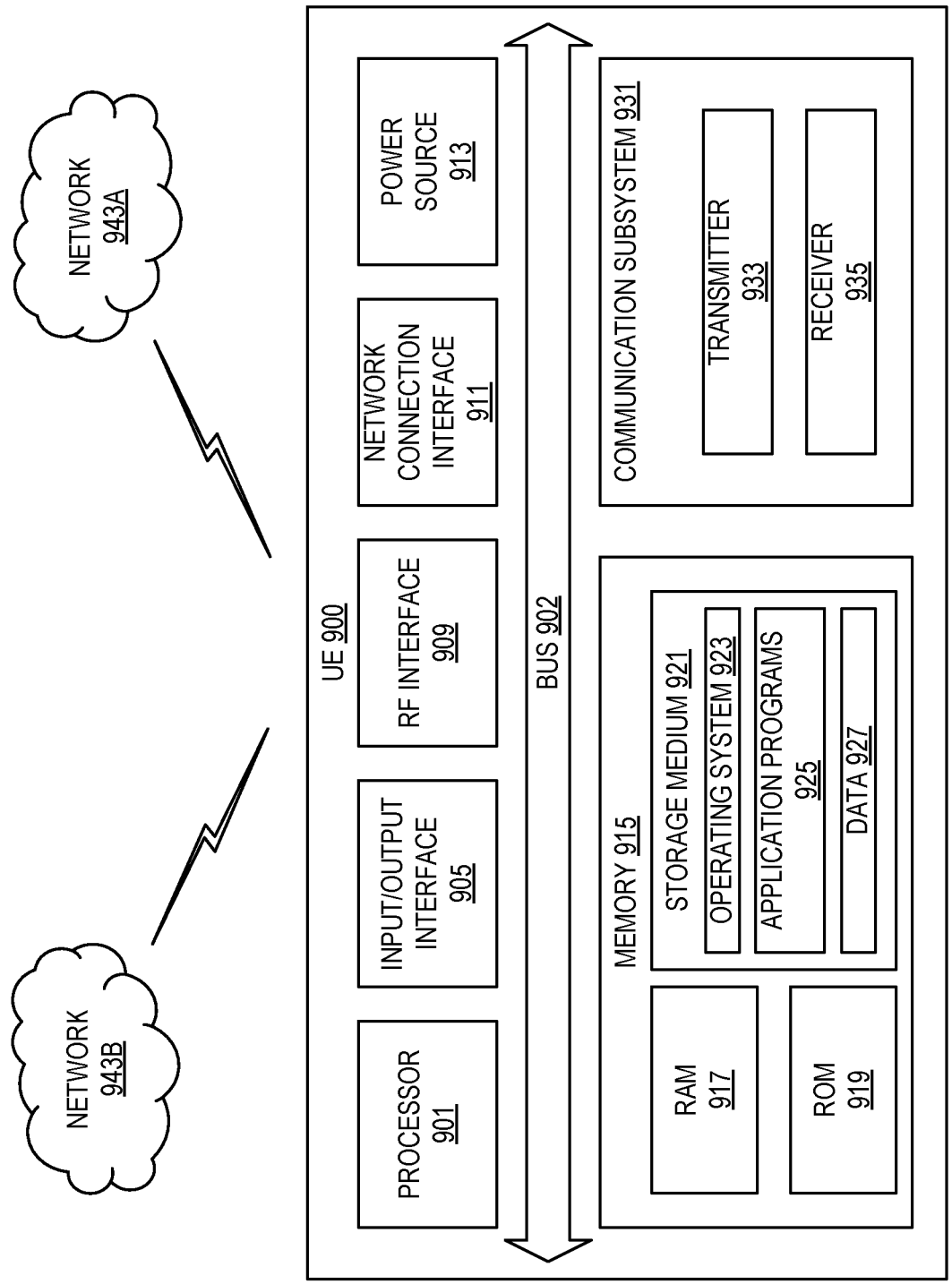
FIG. 9 illustrates one embodiment of a UE in accordance with various aspects described herein.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). A UE 900 may be any UE identified by 3GPP, including a NB-IoT UE, a MTC UE, and/or an enhanced MTC (eMTC) UE. The UE 900, as illustrated in FIG. 9, is one example of a WD configured for communication in accordance with one or more communication standards promulgated by 3GPP, such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, the UE 900 includes processing circuitry 901 that is operatively coupled to an input/output interface 905, an RF interface 909, a network connection interface 911, memory 915 including RAM 917, ROM 919, and a storage medium 921 or the like, a communication subsystem 931, a power source 913, and/or any other component, or any combination thereof. The storage medium 921 includes an operating system 923, an application program 925, and data 927. In other embodiments, the storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, the processing circuitry 901 may be configured to process computer instructions and data. The processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored programs, general purpose processors, such as a microprocessor or DSP, together with appropriate software; or any combination of the above. For example, the processing circuitry 901 may include two CPUs. Data may be information in a form suitable for use by a computer.

In the depicted embodiment, the input/output interface 905 may be configured to provide a communication interface to an input device, output device, or input and output device. The UE 900 may be configured to use an output device via the input/output interface 905. An output device may use the same type of interface port as an input device. For example, a USB port may be used to provide input to and output from the UE 900. The output device may be a speaker, a sound card, a video card, a display, a monitor, a printer, an actuator, an emitter, a smartcard, another output device, or any combination thereof. The UE 900 may be configured to use an input device via the input/output interface 905 to allow a user to capture information into the UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, the RF interface 909 may be configured to provide a communication interface to RF components such as a transmitter, a receiver, and an antenna. The network connection interface 911 may be configured to provide a communication interface to a network 943A. The network 943A may encompass wired and/or wireless networks such as a LAN, a WAN, a computer network, a wireless network, a telecommunications network, another like network or any combination thereof. For example, the network 943A may comprise a WiFi network. The network connection interface 911 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. The network connection interface 911 may implement receiver and transmitter functionality appropriate to the communication network links (e.g., optical, electrical, and the like). The transmitter and receiver functions may share circuit components, software, or firmware, or alternatively may be implemented separately.

The RAM 917 may be configured to interface via a bus 902 to the processing circuitry 901 to provide storage or caching of data or computer instructions during the execution of software programs such as the operating system, application programs, and device drivers. The ROM 919 may be configured to provide computer instructions or data to the processing circuitry 901. For example, the ROM 919 may be configured to store invariant low-level system code or data for basic system functions such as basic Input and Output (I/O), startup, or reception of keystrokes from a keyboard that are stored in a non-volatile memory. The storage medium 921 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 921 may be configured to include the operating system 923, the application program 925 such as a web browser application, a widget or gadget engine, or another application, and the data file 927. The storage medium 921 may store, for use by the UE 900, any of a variety of various operating systems or combinations of operating systems.

The storage medium 921 may be configured to include a number of physical drive units, such as a Redundant Array of Independent Disks (RAID), a floppy disk drive, flash memory, a USB flash drive, an external hard disk drive, a thumb drive, a pen drive, a key drive, a High-Density Digital Versatile Disc (HD-DVD) optical disc drive, an internal hard disk drive, a Blu-Ray optical disc drive, a Holographic Digital Data Storage (HDDS) optical disc drive, an external mini-Dual In-Line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. The storage medium 921 may allow the UE 900 to access computer-executable instructions, application programs, or the like, stored on transitory or non-transitory memory media, to off-load data or to upload data. An article of manufacture, such as one utilizing a communication system, may be tangibly embodied in the storage medium 921, which may comprise a device readable medium.

In FIG. 9, the processing circuitry 901 may be configured to communicate with a network 943B using the communication subsystem 931. The network 943A and the network 943B may be the same network or networks or different network or networks. The communication subsystem 931 may be configured to include one or more transceivers used to communicate with the network 943B. For example, the communication subsystem 931 may be configured to include one or more transceivers used to communicate with one or more remote transceivers of another device capable of wireless communication such as another WD, UE, or base station of a RAN according to one or more communication protocols, such as IEEE 802.9, Code Division Multiple Access (CDMA), WCDMA, GSM, LTE, Universal Terrestrial RAN (UTRAN), WiMax, or the like. Each transceiver may include a transmitter 933 and/or a receiver 935 to implement transmitter or receiver functionality, respectively, appropriate to the RAN links (e.g., frequency allocations and the like). Further, the transmitter 933 and the receiver 935 of each transceiver may share circuit components, software, or firmware, or alternatively may be implemented separately.

In the illustrated embodiment, the communication functions of the communication subsystem 931 may include data communication, voice communication, multimedia communication, short-range communications such as Bluetooth, near-field communication, location-based communication such as the use of the Global Positioning System (GPS) to determine a location, another like communication function, or any combination thereof. For example, the communication subsystem 931 may include cellular communication, WiFi communication, Bluetooth communication, and GPS communication. The network 943B may encompass wired and/or wireless networks such as a LAN, a WAN, a computer network, a wireless network, a telecommunications network, another like network, or any combination thereof. For example, the network 943B may be a cellular network, a WiFi network, and/or a near-field network. A power source 913 may be configured to provide Alternating Current (AC) or Direct Current (DC) power to components of the UE 900.

The features, benefits, and/or functions described herein may be implemented in one of the components of the UE 900 or partitioned across multiple components of the UE 900. Further, the features, benefits, and/or functions described herein may be implemented in any combination of hardware, software, or firmware. In one example, the communication subsystem 931 may be configured to include any of the components described herein. Further, the processing circuitry 901 may be configured to communicate with any of such components over the bus 902. In another example, any of such components may be represented by program instructions stored in memory that, when executed by the processing circuitry 901, perform the corresponding functions described herein. In another example, the functionality of any of such components may be partitioned between the processing circuitry 901 and the communication subsystem 931. In another example, the non-computationally intensive functions of any of such components may be implemented in software or firmware and the computationally intensive functions may be implemented in hardware.

Figure 10:
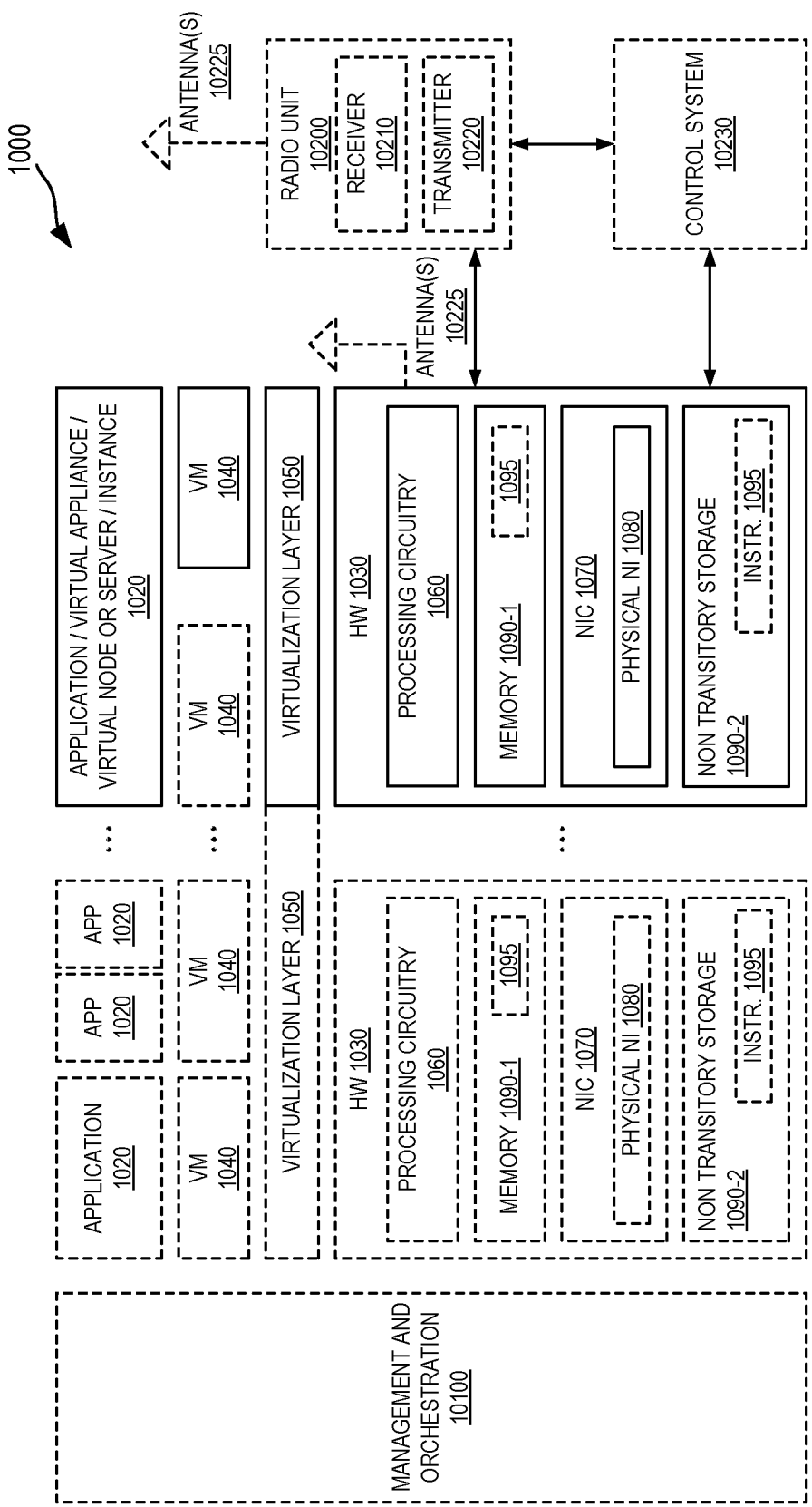
FIG. 10 is a schematic block diagram illustrating a virtualization environment in which functions implemented by some embodiments may be virtualized.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a WD, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. The applications 1020 are run in the virtualization environment 1000 which provides hardware 1030 comprising processing circuitry 1060 and memory 1090. The memory 1090 contains instructions 1095 executable by the processing circuitry 1060 whereby the application 1020 is operative to provide one or more of the features, benefits, and/or functions disclosed herein.

The virtualization environment 1000 comprises general-purpose or special-purpose network hardware devices 1030 comprising a set of one or more processors or processing circuitry 1060, which may be Commercial Off-the-Shelf (COTS) processors, dedicated ASICs, or any other type of processing circuitry including digital or analog hardware components or special purpose processors. Each hardware device 1030 may comprise memory 1090-1 which may be non-persistent memory for temporarily storing instructions 1095 or software executed by the processing circuitry 1060. Each hardware device 1030 may comprise one or more Network Interface Controllers (NICs) 1070, also known as network interface cards, which include a physical network interface 1080. Each hardware device 1030 may also include non-transitory, persistent, machine-readable storage media 1090-2 having stored therein software 1095 and/or instructions executable by the processing circuitry 1060. The software 1095 may include any type of software including software for instantiating one or more virtualization layers 1050 (also referred to as hypervisors), software to execute virtual machines 1040, as well as software allowing it to execute functions, features, and/or benefits described in relation with some embodiments described herein.

The virtual machines 1040, comprise virtual processing, virtual memory, virtual networking or interface, and virtual storage, and may be run by a corresponding virtualization layer 1050 or hypervisor. Different embodiments of the instance of virtual appliance 1020 may be implemented on one or more of the virtual machines 1040, and the implementations may be made in different ways.

During operation, the processing circuitry 1060 executes the software 1095 to instantiate the hypervisor or virtualization layer 1050, which may sometimes be referred to as a Virtual Machine Monitor (VMM). The virtualization layer 1050 may present a virtual operating platform that appears like networking hardware to the virtual machine 1040.

As shown in FIG. 10, the hardware 1030 may be a standalone network node with generic or specific components. The hardware 1030 may comprise an antenna 10225 and may implement some functions via virtualization. Alternatively, the hardware 1030 may be part of a larger cluster of hardware (e.g., such as in a data center or CPE) where many hardware nodes work together and are managed via a Management and Orchestration (MANO) 10100, which, among others, oversees lifecycle management of the applications 1020.

Virtualization of the hardware is in some contexts referred to as Network Function Virtualization (NFV). NFV may be used to consolidate many network equipment types onto industry standard high volume server hardware, physical switches, and physical storage, which can be located in data centers and CPE.

In the context of NFV, the virtual machine 1040 may be a software implementation of a physical machine that runs programs as if they were executing on a physical, non-virtualized machine. Each of the virtual machines 1040, and that part of the hardware 1030 that executes that virtual machine 1040, be it hardware dedicated to that virtual machine 1040 and/or hardware shared by that virtual machine 1040 with others of the virtual machines 1040, forms a separate Virtual Network Element (VNE).

Still in the context of NFV, Virtual Network Function (VNF) is responsible for handling specific network functions that run in one or more virtual machines 1040 on top of the hardware networking infrastructure 1030 and corresponds to the application 1020 in FIG. 10.

In some embodiments, one or more radio units 10200 that each include one or more transmitters 10220 and one or more receivers 10210 may be coupled to the one or more antennas 10225. The radio units 10200 may communicate directly with the hardware nodes 1030 via one or more appropriate network interfaces and may be used in combination with the virtual components to provide a virtual node with radio capabilities, such as a radio access node or a base station.

In some embodiments, some signaling can be effected with the use of a control system 10230, which may alternatively be used for communication between the hardware nodes 1030 and the radio unit 10200.

Figure 11:
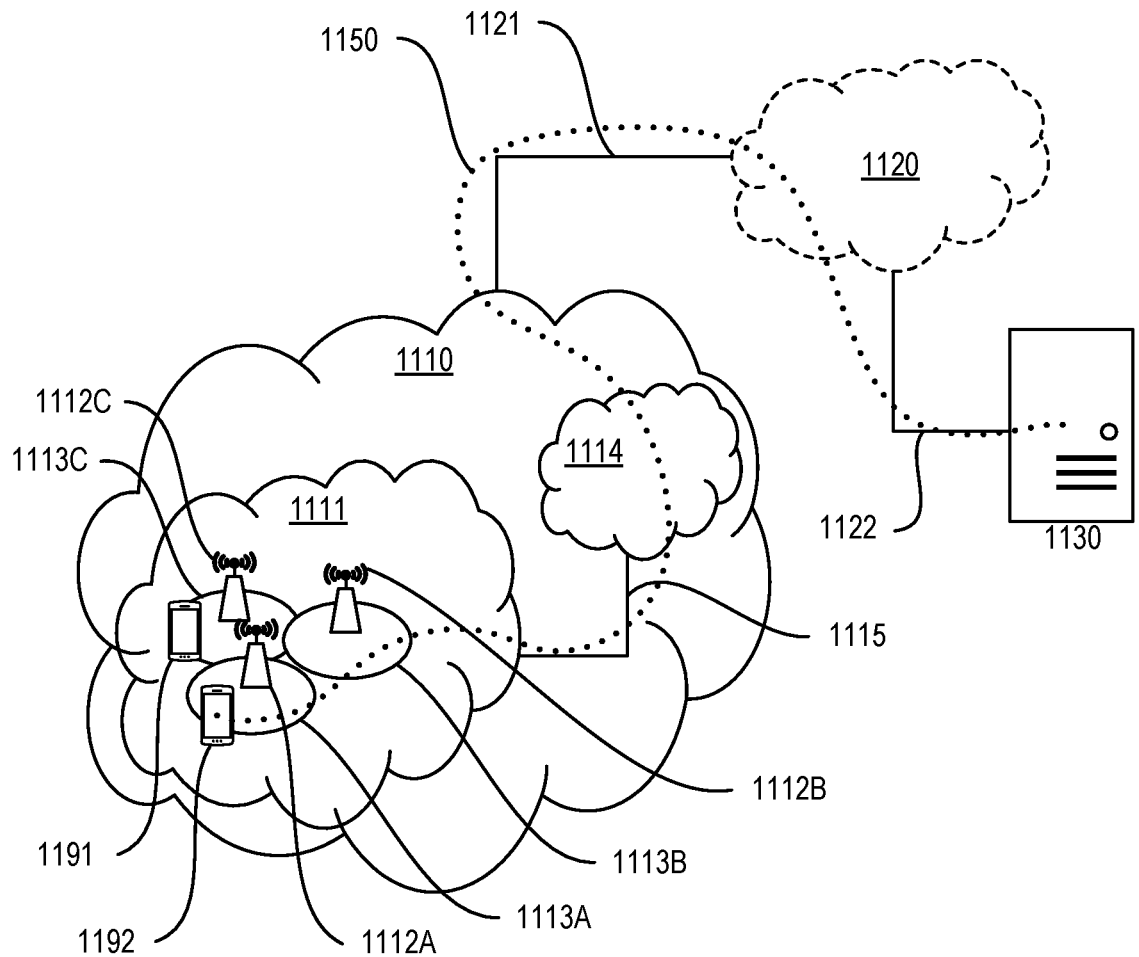
FIG. 11 illustrates a communication system in which embodiments of the present disclosure may be implemented, where the communication system includes a telecommunication network, which comprises an access network and a core network.

With reference to FIG. 11, in accordance with an embodiment, a communication system includes a telecommunication network 1110, such as a 3GPP-type cellular network, which comprises an access network 1111, such as a RAN, and a core network 1114. The access network 1111 comprises a plurality of base stations 1112A, 1112B, 1112C, such as Node Bs, eNBs, gNBs, or other types of wireless APs, each defining a corresponding coverage area 1113A, 1113B, 1113C. Each base station 1112A, 1112B, 1112C is connectable to the core network 1114 over a wired or wireless connection 1115. A first UE 1191 located in coverage area 1113C is configured to wirelessly connect to, or be paged by, the corresponding base station 1112C. A second UE 1192 in coverage area 1113A is wirelessly connectable to the corresponding base station 1112A. While a plurality of UEs 1191, 1192 are illustrated in this example, the disclosed embodiments are equally applicable to a situation where a sole UE is in the coverage area or where a sole UE is connecting to the corresponding base station 1112.

The telecommunication network 1110 is itself connected to a host computer 1130, which may be embodied in the hardware and/or software of a standalone server, a cloud-implemented server, a distributed server, or as processing resources in a server farm. The host computer 1130 may be under the ownership or control of a service provider, or may be operated by the service provider or on behalf of the service provider. Connections 1121 and 1122 between telecommunication network 1110 and the host computer 1130 may extend directly from the core network 1114 to the host computer 1130 or may go via an optional intermediate network 1120. The intermediate network 1120 may be one of, or a combination of more than one of, a public, private, or hosted network; the intermediate network 1120, if any, may be a backbone network or the Internet; in particular, the intermediate network 1120 may comprise two or more sub-networks (not shown).

The communication system of FIG. 11 as a whole enables connectivity between the connected UEs 1191, 1192 and the host computer 1130. The connectivity may be described as an Over-the-Top (OTT) connection 1150. The host computer 1130 and the connected UEs 1191, 1192 are configured to communicate data and/or signaling via the OTT connection 1150, using the access network 1111, the core network 1114, any intermediate network 1120, and possible further infrastructure (not shown) as intermediaries. The OTT connection 1150 may be transparent in the sense that the participating communication devices through which the OTT connection 1150 passes are unaware of routing of uplink and downlink communications. For example, the base station 1112 may not or need not be informed about the past routing of an incoming downlink communication with data originating from the host computer 1130 to be forwarded (e.g., handed over) to a connected UE 1191. Similarly, the base station 1112 need not be aware of the future routing of an outgoing uplink communication originating from the UE 1191 towards the host computer 1130.

Example implementations, in accordance with an embodiment, of the UE, base station, and host computer discussed in the preceding paragraphs will now be described with reference to FIG. 12. In a communication system 1200, a host computer 1210 comprises hardware 1215 including a communication interface 1216 configured to set up and maintain a wired or wireless connection with an interface of a different communication device of the communication system 1200. The host computer 1210 further comprises processing circuitry 1218, which may have storage and/or processing capabilities. In particular, the processing circuitry 1218 may comprise one or more programmable processors, ASICs, FPGAs, or combinations of these (not shown) adapted to execute instructions. The host computer 1210 further comprises software 1211, which is stored in or accessible by the host computer 1210 and executable by the processing circuitry 1218. The software 1211 includes a host application 1212. The host application 1212 may be operable to provide a service to a remote user, such as a UE 1230 connecting via an OTT connection 1250 terminating at the UE 1230 and the host computer 1210. In providing the service to the remote user, the host application 1212 may provide user data which is transmitted using the OTT connection 1250.

The communication system 1200 further includes a base station 1220 provided in a telecommunication system and comprising hardware 1225 enabling it to communicate with the host computer 1210 and with the UE 1230. The hardware 1225 may include a communication interface 1226 for setting up and maintaining a wired or wireless connection with an interface of a different communication device of the communication system 1200, as well as a radio interface 1227 for setting up and maintaining at least a wireless connection 1270 with the UE 1230 located in a coverage area (not shown in FIG. 12) served by the base station 1220. The communication interface 1226 may be configured to facilitate a connection 1260 to the host computer 1210. The connection 1260 may be direct or it may pass through a core network (not shown in FIG. 12) of the telecommunication system and/or through one or more intermediate networks outside the telecommunication system. In the embodiment shown, the hardware 1225 of the base station 1220 further includes processing circuitry 1228, which may comprise one or more programmable processors, ASICs, FPGAs, or combinations of these (not shown) adapted to execute instructions. The base station 1220 further has software 1221 stored internally or accessible via an external connection.

The communication system 1200 further includes the UE 1230 already referred to. The UE's 1230 hardware 1235 may include a radio interface 1237 configured to set up and maintain a wireless connection 1270 with a base station serving a coverage area in which the UE 1230 is currently located. The hardware 1235 of the UE 1230 further includes processing circuitry 1238, which may comprise one or more programmable processors, ASICs, FPGAs, or combinations of these (not shown) adapted to execute instructions. The UE 1230 further comprises software 1231, which is stored in or accessible by the UE 1230 and executable by the processing circuitry 1238. The software 1231 includes a client application 1232. The client application 1232 may be operable to provide a service to a human or non-human user via the UE 1230, with the support of the host computer 1210. In the host computer 1210, the executing host application 1212 may communicate with the executing client application 1232 via the OTT connection 1250 terminating at the UE 1230 and the host computer 1210. In providing the service to the user, the client application 1232 may receive request data from the host application 1212 and provide user data in response to the request data. The OTT connection 1250 may transfer both the request data and the user data. The client application 1232 may interact with the user to generate the user data that it provides.

Figure 12:
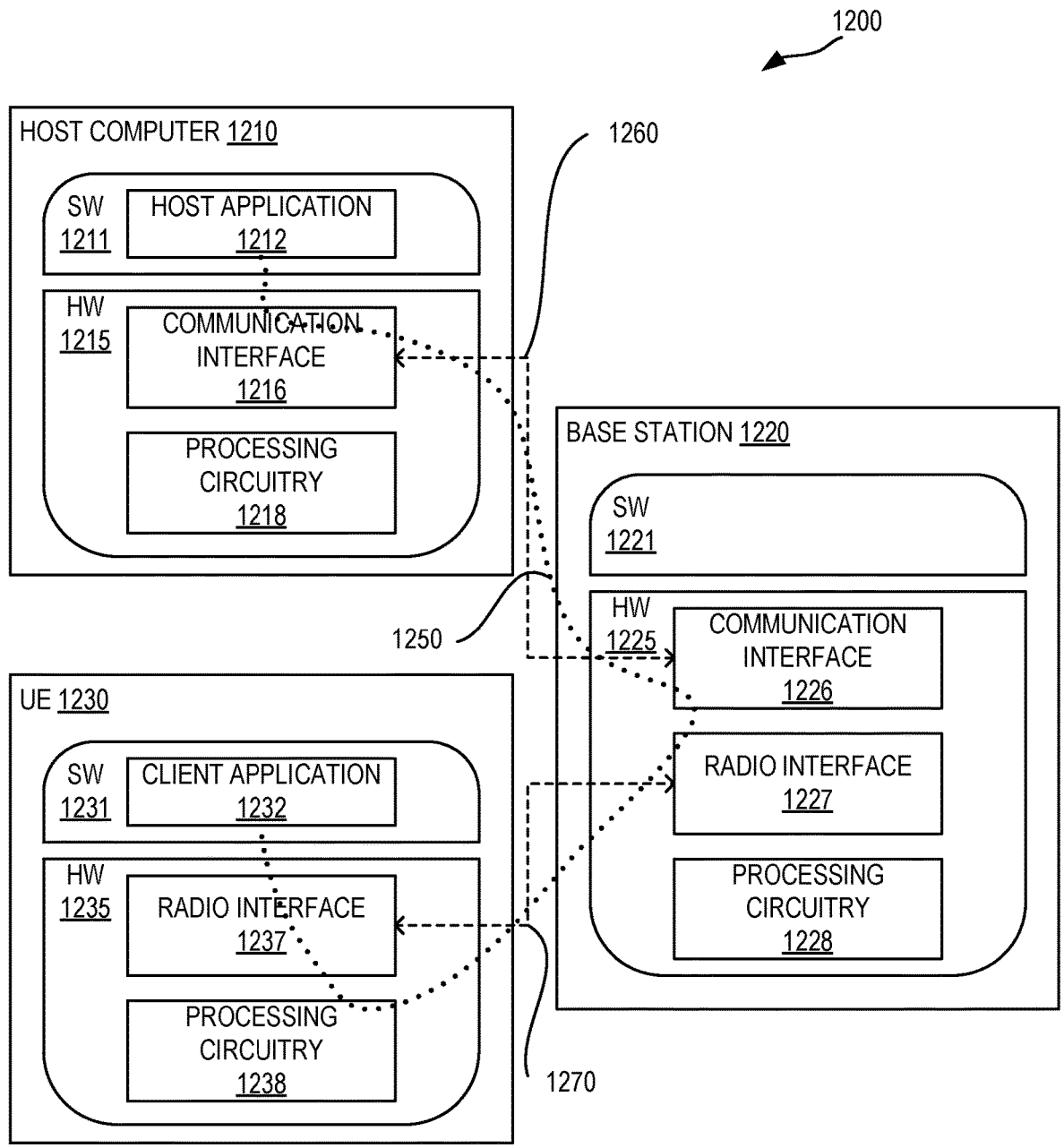
FIG. 12 illustrates example implementations, in accordance with an embodiment, of the UE, base station, and host computer of FIG. 11.

It is noted that the host computer 1210, the base station 1220, and the UE 1230 illustrated in FIG. 12 may be similar or identical to the host computer 1130, one of the base stations 1112A, 1112B, 1112C, and one of the UEs 1191, 1192 of FIG. 11, respectively. This is to say, the inner workings of these entities may be as shown in FIG. 12 and independently, the surrounding network topology may be that of FIG. 11.

In FIG. 12, the OTT connection 1250 has been drawn abstractly to illustrate the communication between the host computer 1210 and the UE 1230 via the base station 1220 without explicit reference to any intermediary devices and the precise routing of messages via these devices. The network infrastructure may determine the routing, which may be configured to hide from the UE 1230 or from the service provider operating the host computer 1210, or both. While the OTT connection 1250 is active, the network infrastructure may further take decisions by which it dynamically changes the routing (e.g., on the basis of load balancing consideration or reconfiguration of the network).

The wireless connection 1270 between the UE 1230 and the base station 1220 is in accordance with the teachings of the embodiments described throughout this disclosure. One or more of the various embodiments improve the performance of OTT services provided to the UE 1230 using the OTT connection 1250, in which the wireless connection 1270 forms the last segment. More precisely, the teachings of these embodiments may improve, e.g., latency and/or power consumption and thereby provide benefits such as, e.g., reduced user waiting time, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1250 between the host computer 1210 and the UE 1230, in response to variations in the measurement results. The measurement procedure and/or the network functionality for reconfiguring the OTT connection 1250 may be implemented in the software 1211 and the hardware 1215 of the host computer 1210 or in the software 1231 and the hardware 1235 of the UE 1230, or both. In some embodiments, sensors (not shown) may be deployed in or in association with communication devices through which the OTT connection 1250 passes; the sensors may participate in the measurement procedure by supplying values of the monitored quantities exemplified above, or supplying values of other physical quantities from which the software 1211, 1231 may compute or estimate the monitored quantities. The reconfiguring of the OTT connection 1250 may include message format, retransmission settings, preferred routing, etc.; the reconfiguring need not affect the base station 1220, and it may be unknown or imperceptible to the base station 1220. Such procedures and functionalities may be known and practiced in the art. In certain embodiments, measurements may involve proprietary UE signaling facilitating the host computer 1210's measurements of throughput, propagation times, latency, and the like. The measurements may be implemented in that the software 1211 and 1231 causes messages to be transmitted, in particular empty or 'dummy' messages, using the OTT connection 1250 while it monitors propagation times, errors, etc.

FIG. 13 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 13 will be included in this section. In step 1310 (which may be optional), the UE receives input data provided by the host computer. Additionally or alternatively, in step 1320, the UE provides user data. In sub-step 1321 (which may be optional) of step 1320, the UE provides the user data by executing a client application. In sub-step 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in sub-step 1330 (which may be optional), transmission of the user data to the host computer. In step 1340 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Figure 15:
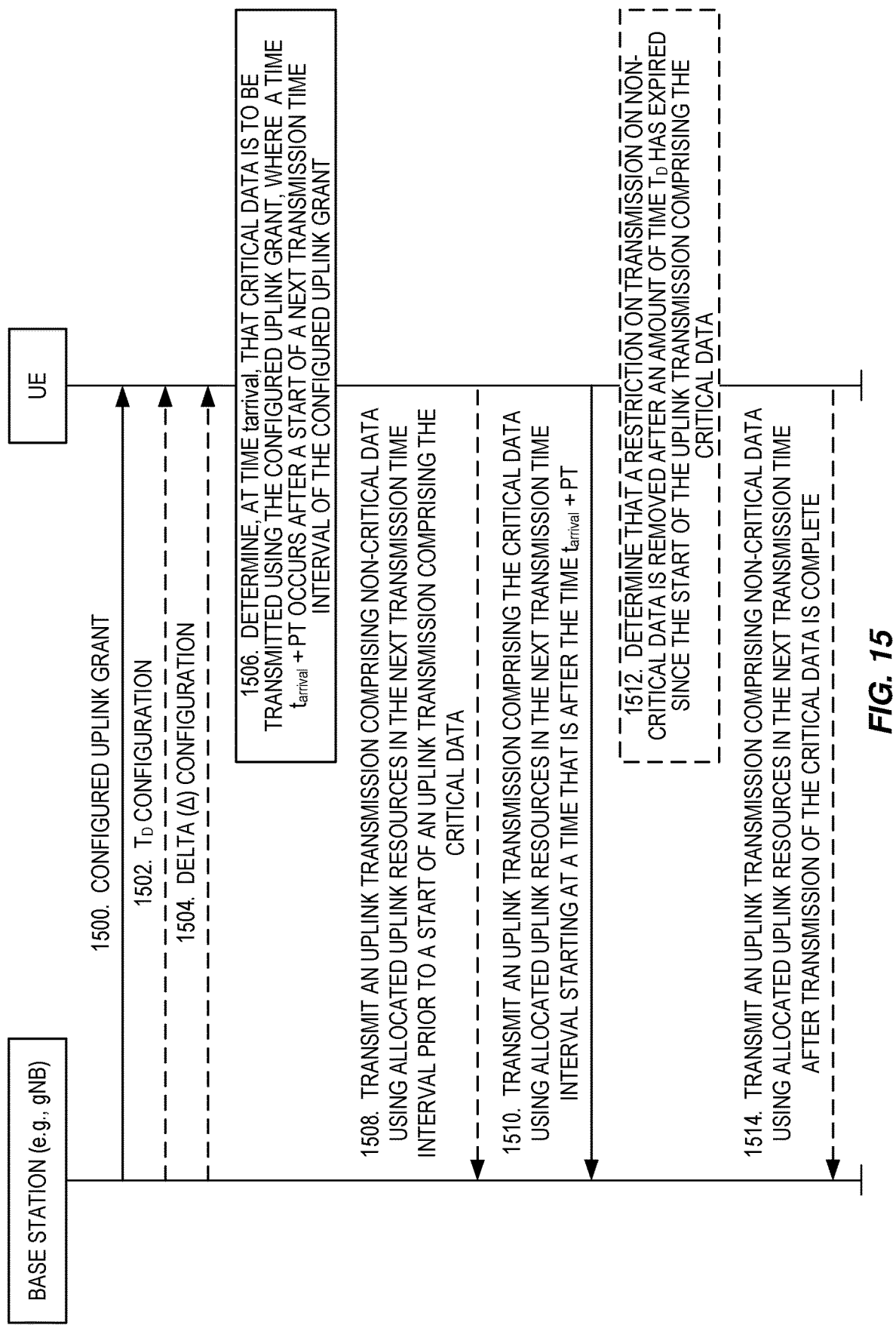
FIG. 15 illustrates the operation of a UE and a base station in accordance with some embodiments of the present disclosure.

FIG. 15 illustrates the operation of a base station (e.g., gNB) and a UE in accordance with at least some aspects of the embodiments described above. Examples of the base station are the network node 860 of FIG. 8, the virtualized base station 1000 of FIG. 10, the base station 1112 of FIG. 11, and the base station 1220 of FIG. 12. Examples of the UE are the wireless device 810 of FIG. 8, the UE 900 of FIG. 9, the UE 1191 of FIG. 11, and the UE 1230 of FIG. 12. Note that optional steps are represented by dashed lines.

As illustrated, the base station sends, to the UE, a configured uplink grant (step 1500). As described above, the configured uplink grant allocates uplink resources in two or more transmission time intervals, which are also referred to herein as transmission occasions or transmission opportunities. Optionally, the base station also configures a value for $T_D$ and/or a value for the noncriticalDelta, which is denoted here as "$\Delta$", as described above (steps 1502 and 1504). Note that while illustrated separately for clarity, the base station may, in some embodiments, provide the $T_D$ configuration and/or the $\Delta$ configuration in the configured uplink grant (e.g., in the same RRC IE).

The UE determines, at a time $t_{arrival}$, that critical data is to be transmitted using the configured uplink grant, where a time $t_{arrival}$+PT occurs after a start of a particular transmission time interval of the configured uplink grant and where PT is a preparation time needed to prepare an uplink transmission on the configured uplink grant (step 1506).

Figure 7:
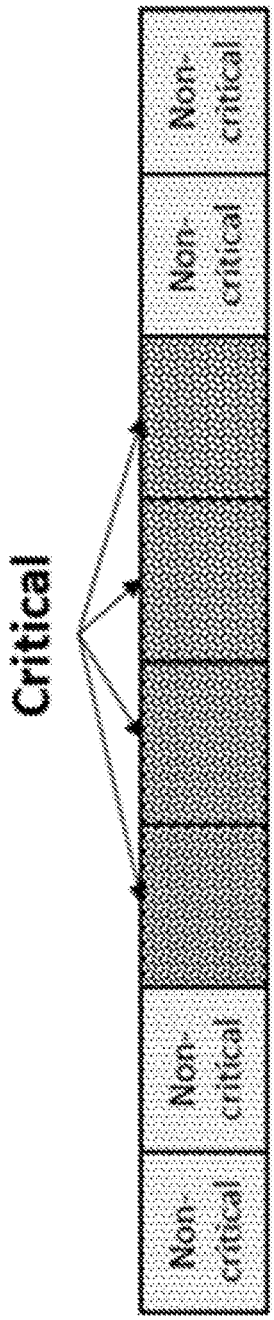
FIG. 7 illustrates an example of transmitting non-critical data both before and after a mid-PUSCH transmission of critical data in accordance with some embodiments of the present disclosure.

Optionally, in some embodiments, the UE transmits an uplink transmission comprising non-critical data using at least some of the uplink resources in the particular transmission time interval of the configured uplink grant that are prior to the start of an uplink transmission comprising the critical data, e.g., as illustrated in the example of FIG. 7 (step 1508).

The UE transmits an uplink transmission comprising the critical data using allocated uplink resources in the particular transmission time interval starting at a time that is at or after the time $t_{arrival}$+PT (step 1510). In some embodiments, the start of the uplink transmission comprising the critical data can start at any OFDM symbol in the particular transmission time interval that is after the time $t_{arrival}$+PT (e.g., at the first OFDM symbol in the particular transmission time interval that is after the time $t_{arrival}$+PT). In some other embodiments, the transmission time intervals of the uplink grant are each divided into two or more sub-occasions. In other words, two or more discrete starting points within each of the transmission time intervals are defined. In this case, the start of the uplink transmission comprising the critical data can start at the start of any sub-occasion in the particular transmission time interval that starts after the time $t_{arrival}$+PT (e.g., at the first sub-occasion in the particular transmission time interval that starts after the time $t_{arrival}$+PT).

Optionally, the UE determines that a restriction on transmission of non-critical data is removed after an amount of time $T_D$ has expired since the start of the uplink transmission comprising the critical data (step 1512). Optionally, the UE transmits an uplink transmission comprising non-critical data using allocated uplink resources in the particular transmission time interval after the uplink transmission comprising the critical data is complete (e.g., upon determining that the restriction is removed in step 1512) (step 1514).

As discussed above, in order to receive the uplink transmission comprising the critical data in step 1510 and, optionally, the uplink transmission comprising non-critical data in step 1508 and/or step 1514, the base station monitors for uplink transmissions during the transmission time interval of the configured uplink grant. As discussed above, in some embodiments, the base station attempts to decode (i.e., monitors for) an uplink transmission at each OFDM symbol. In some other embodiments, the base station attempts to decode (i.e., monitors for) an uplink transmission at the discrete points during the transmission time interval at which an uplink transmission from the UE may begin.

Figure 16:
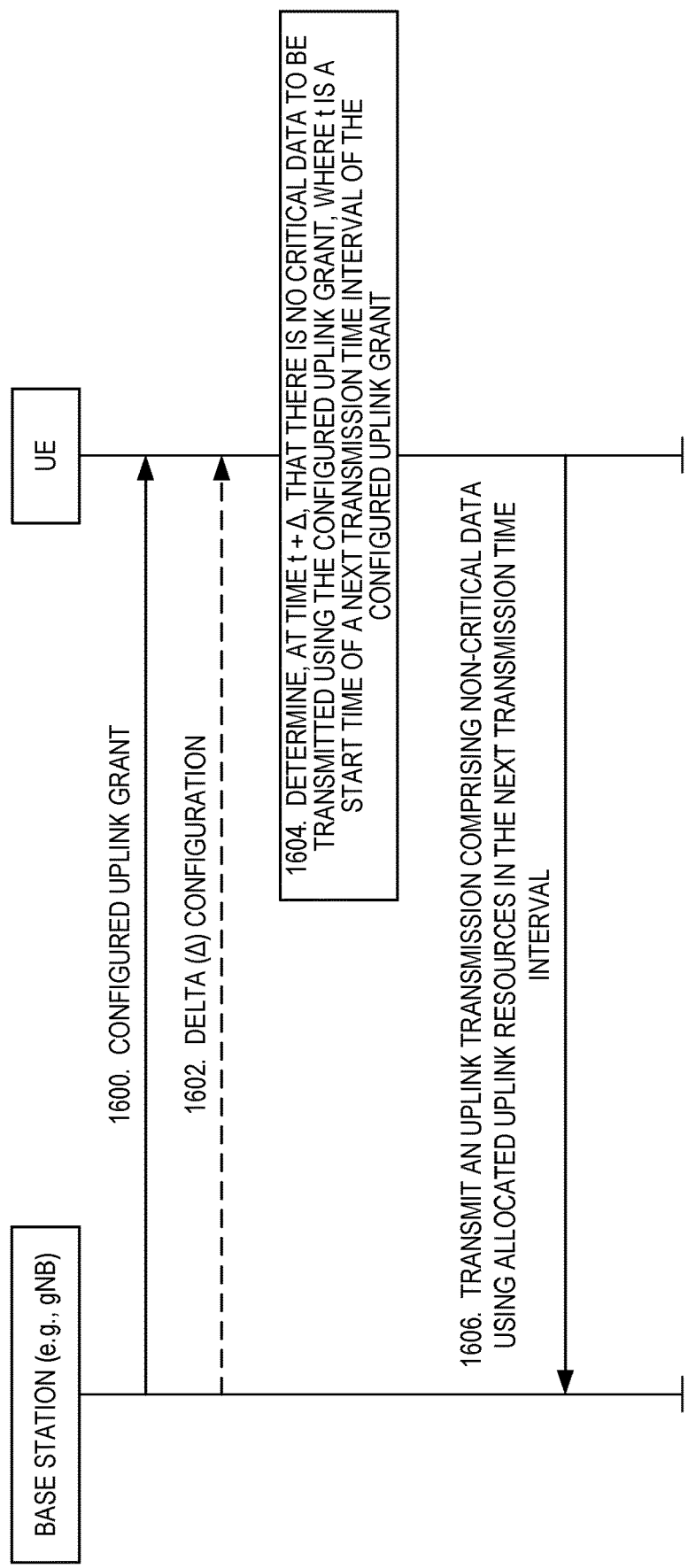
FIG. 16 illustrates the operation of a UE and a base station in accordance with some other embodiments of the present disclosure.

FIG. 16 illustrates the operation of a base station (e.g., gNB) and a UE in accordance with at least some aspects of the embodiments described above. Examples of the base station are the network node 860 of FIG. 8, the virtualized base station 1000 of FIG. 10, the base station 1112 of FIG. 11, and the base station 1220 of FIG. 12. Examples of the UE are the wireless device 810 of FIG. 8, the UE 900 of FIG. 9, the UE 1191 of FIG. 11, and the UE 1230 of FIG. 12. Note that optional steps are represented by dashed lines. Also note that the example embodiments of FIGS. 15 and 16 may be combined and used for different transmission time intervals of the same configured uplink grant.

As illustrated, the base station sends, to the UE, a configured uplink grant (step 1600). As described above, the configured uplink grant allocates uplink resources in two or more transmission time intervals, which are also referred to herein as transmission occasions or transmission opportunities. Optionally, the base station also configures a value for the noncriticalDelta, which is denoted here as "$\Delta$" (step 1602). Note that while illustrated separately for clarity, the base station may, in some embodiments, provide the $\Delta$ configuration in the configured uplink grant (e.g., in the same RRC IE).

The UE determines, at a time t+$\Delta$, that there is no critical data to be transmitted using the configured uplink grant, where the time t is a start time of a particular transmission time interval of the configured uplink grant (step 1604). In other words, after the start (t) of this particular transmission time interval, the UE monitors for critical data that is ready for transmission (i.e., critical data that has arrived and has been processed for transmission). If Δ amount of time expires after the start (t) of the particular transmission time interval without critical data being ready for transmission, the UE determines that there is no critical data to be transmitted in this particular transmission time interval. Upon making the determination in step 1604, the UE transmits an uplink transmission comprising non-critical data using at least some of the uplink resources in the particular transmission time interval of the configured uplink grant starting at or after the time t+Δ, as discussed above (step 1606).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 17:
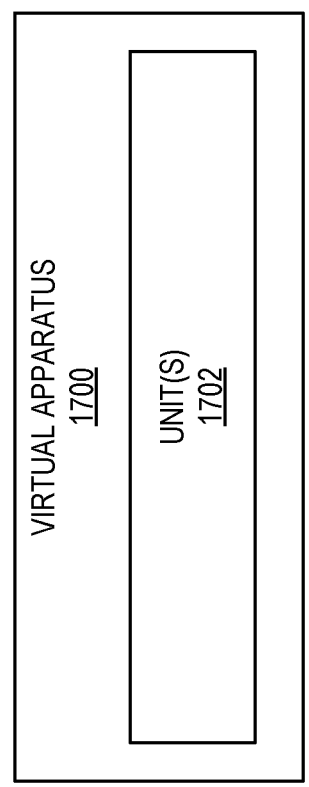
FIG. 17 illustrates a schematic block diagram of an apparatus in a wireless network in accordance with some embodiments of the present disclosure.

FIG. 17 illustrates a schematic block diagram of an apparatus 1700 in a wireless network (for example, the wireless network shown in FIG. 8). The apparatus 1700 may be implemented in a wireless device or network node (e.g., the WD 810 or the network node 860 shown in FIG. 8). In some embodiments, the apparatus 1700 is operable to carry out the example method of operation of a network node (e.g., base station) as described herein (e.g., carry out the method of operation of the base station in FIG. 15 and/or FIG. 16) and/or possibly any other processes or methods disclosed herein. In some other embodiments, the apparatus 1700 is operable to carry out the method of operation of a UE as described herein (e.g., carry out the method of operation of the UE described in FIG. 15 and/or FIG. 16) and/or possibly any other processes or methods disclosed herein. It is also to be understood that the method of operation of the base station or UE of FIG. 15 and/or FIG. 16 is not necessarily carried out solely by the apparatus 1700. At least some operations of the method can be performed by one or more other entities.

The apparatus 1700 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause one or more units 1702, and any other suitable units of the apparatus 1700 to perform corresponding functions according one or more embodiments of the present disclosure.

For example, if the apparatus 1700 is implemented in a base station, the apparatus 1700 includes unit(s) 1702 which may include a configuring unit(s) configured to perform the functions of the base station described above with respect to steps 1500-1504 and/or steps 1600-1602. As another example, if the apparatus 1700 is implemented in a UE, the apparatus 1700 includes unit(s) 1702 which may include a configuring unit(s) configured to perform the functions of the UE described above with respect to steps 1506-1510 and 1514 and/or steps 1604-1606.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Example embodiments of the present disclosure are as follows:

Group A Embodiments

Embodiment 1: A method performed by a wireless device for transmitting a mixture of critical and non-critical data, the method comprising: receiving (1500) a configured uplink grant that allocates uplink resources in a plurality of transmission time intervals; determining (1506), at a time $t_{arrival}$, that critical data is to be transmitted using the configured uplink grant, where a time $t_{arrival}$+PT occurs after a start of a next transmission time interval from among the plurality of transmission time intervals and where PT is a preparation time needed to prepare an uplink transmission on the configured uplink grant; and transmitting (1510) an uplink transmission comprising the critical data using allocated uplink resources in the next transmission time interval starting at a time that is at or after the time $t_{arrival}$+PT.

Embodiment 2: The method of embodiment 1 wherein two or more discrete points in time at which uplink transmission can begin are defined within the next transmission time interval, and the time at which the uplink transmission comprising the critical data starts is a time that corresponds to one of the two or more discrete points that occurs at or after $t_{arrival}$+PT.

Embodiment 3: The method of any one of embodiments 1 to 2 further comprising receiving a configuration of a duration, $T_D$, of transmission for expected critical data.

Embodiment 4: The method of any one of embodiments 1 to 3 further comprising determining (1512) that a restriction on transmission of non-critical data is removed after an amount of time $T_D$ has expired since the start of the uplink transmission comprising the critical data.

Embodiment 5: The method of any one of embodiments 1 to 4 further comprising transmitting (1514) an uplink transmission comprising non-critical data using allocated uplink resources in the next transmission time interval after the uplink transmission comprising the critical data is complete.

Embodiment 6: The method of any one of embodiments 1 to 5 further comprising transmitting (1508) an uplink transmission comprising non-critical data using allocated uplink resources in the next transmission time interval before the start of the uplink transmission comprising the critical data.

Embodiment 7: The method of any one of embodiments 1 to 6 further comprising, for a later transmission time interval from among that plurality of transmission time intervals that occurs after the next transmission time interval in which the critical data was transmitted: determining (1604), at a time t+Δ, that there is no critical data to be transmitted during the later transmission time interval of the configured uplink grant, where t is a start time of the later transmission time interval and Δ is a predefined or configured amount of time; and, upon determining, at a time t+Δ, that there is no critical data to be transmitted during the later transmission time interval of the configured uplink grant, transmitting (1606) an uplink transmission comprising non-critical data using allocated uplink resources in the later transmission time interval starting at a time at or after t+Δ.

Embodiment 8: The method of embodiment 7 further comprising receiving (1504, 1602) a configuration of Δ associated with the configured uplink grant.

Embodiment 9: The method of any of the previous embodiments, further comprising: providing user data; and forwarding the user data to a host computer via the transmission to the base station.

Group B Embodiments

Embodiment 10: A method performed by a base station, the method comprising: transmitting (1500, 1600) a configured uplink grant to a wireless device, the configured uplink grant allocating uplink resources for uplink transmission from the wireless device in a plurality of transmission time intervals; and monitoring (1510) a transmission time interval from among the plurality of transmission time intervals of the configured uplink grant for an uplink transmission from the wireless device, wherein the uplink transmission can start sometime after a start of the transmission time interval.

Embodiment 11: The method of embodiment 10 wherein the uplink transmission can start at any OFDM symbol within the transmission time interval.

Embodiment 12: The method of embodiment 10 wherein the uplink transmission can start at any one of two or more discrete points within the transmission time interval.

Embodiment 13: The method of any one of embodiments 10 to 12 further comprising configuring (1502), for the wireless device, a duration time expected for uplink transmissions of critical data in relation to the configured uplink grant.

Embodiment 14: The method of any one of embodiments 10 to 13 further comprising configuring (1504, 1602), for the wireless device, a delta value that defines an amount of time after the start of the transmission time interval after which a restriction on transmission of non-critical data is removed if there is no critical data to be transmitted by the wireless device on the configured uplink grant.

Embodiment 15: The method of any of the previous embodiments, further comprising: obtaining user data; and forwarding the user data to a host computer or a wireless device.

Group C Embodiments

Embodiment 16: A wireless device for transmitting a mixture of critical and non-critical data, the wireless device comprising: processing circuitry configured to perform any of the steps of any of the Group A embodiments; and power supply circuitry configured to supply power to the wireless device.

Embodiment 17: A base station, the base station comprising: processing circuitry configured to perform any of the steps of any of the Group B embodiments; power supply circuitry configured to supply power to the base station.

Embodiment 18: A User Equipment, UE, for transmitting a mixture of critical and non-critical data, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 19: A communication system including a host computer comprising: communication interface configured to receive user data originating from a transmission from a User Equipment, UE, to a base station, wherein the UE comprises a radio interface and processing circuitry, the UE's processing circuitry configured to perform any of the steps of any of the Group A embodiments.

Embodiment 20: The communication system of the previous embodiment, further including the UE.

Embodiment 21: The communication system of the previous 2 embodiments, further including the base station, wherein the base station comprises a radio interface configured to communicate with the UE and a communication interface configured to forward to the host computer the user data carried by a transmission from the UE to the base station.

Embodiment 22: The communication system of the previous 3 embodiments, wherein: the processing circuitry of the host computer is configured to execute a host application; and the UE's processing circuitry is configured to execute a client application associated with the host application, thereby providing the user data.

Embodiment 23: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 24: A method implemented in a communication system including a host computer, a base station and a User Equipment, UE, the method comprising: at the host computer, receiving user data transmitted to the base station from the UE, wherein the UE performs any of the steps of any of the Group A embodiments.

Embodiment 25: The method of the previous embodiment, further comprising, at the UE, providing the user data to the base station.

Embodiment 26: The method of the previous 2 embodiments, further comprising: at the UE, executing a client application, thereby providing the user data to be transmitted; and at the host computer, executing a host application associated with the client application.

Embodiment 27: The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Embodiment 28: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 29: The communication system of the previous embodiment further including the base station.

Embodiment 30: The communication system of the previous 2 embodiments, further including the UE, wherein the UE is configured to communicate with the base station.

Embodiment 31: The communication system of the previous 3 embodiments, wherein: the processing circuitry of the host computer is configured to execute a host application; the UE is configured to execute a client application associated with the host application, thereby providing the user data to be received by the host computer.

Embodiment 32: A method implemented in a communication system including a host computer, a base station and a User Equipment, UE, the method comprising: at the host computer, receiving, from the base station, user data originating from a transmission which the base station has received from the UE, wherein the UE performs any of the steps of any of the Group A embodiments.

Embodiment 33: The method of the previous embodiment, further comprising at the base station, receiving the user data from the UE.

Embodiment 34: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
AC Alternating Current
AP Access Point
ASIC Application Specific Integrated Circuit
ATM Asynchronous Transfer Mode
BS Base Station
BSC Base Station Controller
BTS Base Transceiver Station
BWP Bandwidth Part
CD Compact Disk
CDMA Code Division Multiple Access
CG Cell Group
COTS Commercial Off-the-Shelf
CPE Customer Premise Equipment
CPU Central Processing Unit
D2D Device-to-Device
DAS Distributed Antenna System
DC Direct Current
DIMM Dual In-Line Memory Module
DMRS Demodulation Reference Signal
DSP Digital Signal Processor
DVD Digital Video Disk
EEPROM Electrically Erasable Programmable Read Only Memory
eMBB Enhanced Mobile Broadband
eNB Evolved Node B
EPROM Erasable Programmable Read Only Memory
E-SMLC Evolved Serving Mobile Location Center
FPGA Field Programmable Gate Array
GHz Gigahertz
gNB New Radio Node B
GPS Global Positioning System
GSM Global System for Mobile Communications
HARQ Hybrid Automatic Repeat Request
HDDS Holographic Digital Data Storage
HD-DVD High-Density Digital Versatile Disc
ID Identifier
IE Information Element
I/O Input and Output
IoT Internet of Things
IP Internet Protocol
LAN Local Area Network
LCH Logical Channel
LCP Logical Channel Prioritization
LEE Laptop Embedded Equipment
LME Laptop Mounted Equipment
LTE Long Term Evolution
M2M Machine-to-Machine
MAC Medium Access Control
MANO Management and Orchestration
MBB Mobile Broadband
MCE Multi-Cell/Multicast Coordination Entity
MDT Minimization of Drive Tests
MIMO Multiple Input Multiple Output
MME Mobility Management Entity
MSC Mobile Switching Center
MSR Multi-Standard Radio
MTC Machine-Type Communication
NB-IoT Narrowband Internet of Things
NFV Network Function Virtualization
NIC Network Interface Controller
NR New Radio
O&M Operation and Maintenance
OFDM Orthogonal Frequency Division Multiplexing
OSS Operations Support System
OTT Over-the-Top
PDA Personal Digital Assistant PDCCH Physical Downlink Control Channel
PDU Protocol Data Unit
PHY Physical
PROM Programmable Read Only Memory
PSTN Public Switched Telephone Networks
PT Preparation Time
PUSCH Physical Uplink Shared Channel
RAID Redundant Array of Independent Disks
RAM Random Access Memory
RAT Radio Access Technology
RF Radio Frequency
RNC Radio Network Controller
ROM Read Only Memory
RRC Radio Resource Control
RRH Remote Radio Head
RRU Remote Radio Unit
RUIM Removable User Identity
SDRAM Synchronous Dynamic Random Access Memory
SIM Subscriber Identity Module
SOC System on a Chip
SON Self-Organizing Network
SONET Synchronous Optical Networking
TB Transport Block
TCP Transmission Control Protocol
TS Technical Specification
TSN Time Sensitive Networking
UE User Equipment
UMTS Universal Mobile Telecommunications System
URLLC Ultra-Reliable and Low Latency Communication
USB Universal Serial Bus
UTRAN Universal Terrestrial Radio Access Network
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A method performed by a wireless device for transmitting a mixture of critical and non-critical data, the method comprising:
   receiving a configured uplink grant that allocates uplink resources in a plurality of transmission time intervals;
   determining, at a time $t_{arrival}$, that critical data is to be transmitted using the configured uplink grant, where a time $t_{arrival}+PT$ occurs after a start of a particular transmission time interval from among the plurality of transmission time intervals and where PT is a preparation time needed to prepare an uplink transmission on the configured uplink grant; and
   transmitting an uplink transmission comprising the critical data using allocated uplink resources in the particular transmission time interval starting at a time that is at or after the time $t_{arrival}+PT$.

2. The method of claim 1 wherein transmitting the uplink transmission comprises, after the critical data has arrived at the wireless device for transmission at the time $t_{arrival}$, preparing the uplink transmission comprising the critical data, wherein preparing the uplink transmission comprising the critical data comprises:
   processing the critical data to create a Medium Access Control, MAC, Protocol Data Unit, PDU; and
   providing the MAC PDU to a Physical, PHY, layer of the wireless device for transmission.

3. The method of claim 1 wherein MAC PDU creation is postponed for the particular transmission time interval until the critical data has arrived for transmission.

4. The method of claim 1 wherein two or more discrete points in time at which uplink transmission can begin are defined within the particular transmission time interval, and the time at which the uplink transmission comprising the critical data starts is a time that corresponds to one of the two or more discrete points that occurs at or after $t_{arrival}+PT$.

5. The method of claim 1 further comprising receiving a configuration of a duration, $T_D$, of transmission for expected critical data.

6. The method of claim 1 wherein there is a restriction on transmission of non-critical data for the configured uplink grant, and the method further comprises determining that the restriction on transmission of non-critical data is removed for the particular transmission time interval after an amount of time $T_D$ has expired since the start of the uplink transmission comprising the critical data.

7. The method of claim 6 further comprising transmitting an uplink transmission comprising non-critical data using allocated uplink resources in the particular transmission time interval after the amount of time $T_D$ has expired since the start of the uplink transmission comprising the critical data.

8. The method of claim 1 further comprising transmitting an uplink transmission comprising non-critical data using allocated uplink resources in the particular transmission time interval after the uplink transmission comprising the critical data is complete.

9. The method of claim 1 further comprising transmitting an uplink transmission comprising non-critical data using allocated uplink resources in the particular transmission time interval before the start of the uplink transmission comprising the critical data.

10. The method of claim 1 further comprising, for a later transmission time interval from among the plurality of transmission time intervals that occurs after the particular transmission time interval in which the critical data was transmitted:
    determining, at a time $t+\Delta$, that there is no critical data to be transmitted during the later transmission time interval of the configured uplink grant, where t is a start time of the later transmission time interval and $\Delta$ is a predefined or configured amount of time; and
    upon determining, at the time $t+\Delta$, that there is no critical data to be transmitted during the later transmission time interval of the configured uplink grant, transmitting an uplink transmission comprising non-critical data using allocated uplink resources in the later transmission time interval starting at a time at or after $t+\Delta$.

11. The method of claim 10 further comprising receiving a configuration of $\Delta$ associated with the configured uplink grant.

12. The method of claim 10 wherein $\Delta$ is at least K*L Orthogonal Frequency Division Multiplexing, OFDM, symbols where K is a number of configured repetitions for a critical data transmission and L is a duration of each repetition of the critical data transmission.

13. The method of claim 10 wherein $\Delta$ is at least K*14 Orthogonal Frequency Division Multiplexing, OFDM, symbols where K is a number of configured repetitions for a critical data transmission.

14. A method performed by a base station, the method comprising:
transmitting a configured uplink grant to a wireless device, the configured uplink grant allocating uplink resources for uplink transmission from the wireless device in a plurality of transmission time intervals; and
monitoring a transmission time interval from among the plurality of transmission time intervals of the configured uplink grant for an uplink transmission from the wireless device, wherein the uplink transmission can start sometime after a start of the transmission time interval;
wherein there is a restriction on transmission of non-critical data for the configured uplink grant, and the method further comprises configuring, for the wireless device, a delta value that defines an amount of time after the start of the transmission time interval after which a restriction on transmission of non-critical data is removed if there is no critical data to be transmitted by the wireless device on the configured uplink grant.

15. The method of claim 14 wherein the uplink transmission can start at any Orthogonal Frequency Division Multiplexing, OFDM, symbol within the transmission time interval.

16. The method of claim 14 wherein the uplink transmission can start at any one of two or more discrete points within the transmission time interval.

17. The method of claim 14 further comprising configuring, for the wireless device, a duration time expected for uplink transmissions of critical data in relation to the configured uplink grant.

18. The method of claim 14 wherein the delta value is at least K*L Orthogonal Frequency Division Multiplexing, OFDM, symbols where K is a number of configured repetitions for a critical data transmission and L is a duration of each repetition of the critical data transmission.

19. The method of claim 14 wherein the delta value is at least K*14 Orthogonal Frequency Division Multiplexing, OFDM, symbols where K is a number of configured repetitions for a critical data transmission.

20. A wireless device for transmitting a mixture of critical and non-critical data, the wireless device comprising:
radio front end circuitry; and
processing circuitry associated with the radio front end circuitry, the processing circuitry configured to cause the wireless device to:
receive a configured uplink grant that allocates uplink resources in a plurality of transmission time intervals;
determine, at a time $t_{arrival}$, that critical data is to be transmitted using the configured uplink grant, where a time $t_{arrival}$+PT occurs after a start of a particular transmission time interval from among the plurality of transmission time intervals and where PT is a preparation time needed to prepare an uplink transmission on the configured uplink grant; and
transmit an uplink transmission comprising the critical data using allocated uplink resources in the particular transmission time interval starting at a time that is at or after the time $t_{arrival}$+PT.

21. A base station comprising:
processing circuitry configured to cause the base station to:
transmit a configured uplink grant to a wireless device, the configured uplink grant allocating uplink resources for uplink transmission from the wireless device in a plurality of transmission time intervals; and
monitor a transmission time interval from among the plurality of transmission time intervals of the configured uplink grant for an uplink transmission from the wireless device, wherein the uplink transmission can start sometime after a start of the transmission time interval;
wherein there is a restriction on transmission of non-critical data for the configured uplink grant, and the processing circuitry is further configured to cause the base station to configure, for the wireless device, a delta value that defines an amount of time after the start of the transmission time interval after which a restriction on transmission of non-critical data is removed if there is no critical data to be transmitted by the wireless device on the configured uplink grant.

* * * * *